(12) United States Patent
Inoue

(10) Patent No.: US 7,352,742 B2
(45) Date of Patent: Apr. 1, 2008

(54) METHOD AND APPARATUS FOR TRANSMITTING TO AN UPPER LAYER OF INFORMATION INCLUDED IN A PACKET

(75) Inventor: Noriko Inoue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1011 days.

(21) Appl. No.: 10/383,635

(22) Filed: Mar. 10, 2003

(65) Prior Publication Data

US 2003/0210709 A1  Nov. 13, 2003

(30) Foreign Application Priority Data

Mar. 11, 2002 (JP) ............................ P2002-066010

(51) Int. Cl.
*H04L 12/28* (2006.01)
*H04L 12/56* (2006.01)

(52) U.S. Cl. ................... 370/389; 370/392; 370/422

(58) Field of Classification Search ............... None
See application file for complete search history.

(56) References Cited

U.S. PATENT DOCUMENTS

| 6,219,697 | B1 | 4/2001 | Lawande et al. | |
| 6,519,544 | B1 * | 2/2003 | Deguchi et al. | 702/117 |
| 6,529,951 | B1 * | 3/2003 | Okuyama et al. | 709/223 |
| 2001/0003526 | A1 * | 6/2001 | Kanehara | 370/465 |
| 2002/0067697 | A1 * | 6/2002 | Ito et al. | 370/242 |
| 2002/0114275 | A1 * | 8/2002 | Usuba | 370/229 |
| 2004/0213237 | A1 * | 10/2004 | Yasue et al. | 370/392 |
| 2006/0209835 | A1 * | 9/2006 | Sainomoto et al. | 370/392 |

FOREIGN PATENT DOCUMENTS

| JP | 5-300152 | 11/1993 |
| JP | 2001-103076 | 4/2001 |

\* cited by examiner

*Primary Examiner*—Chirag G. Shah
(74) *Attorney, Agent, or Firm*—Oblon, Spivak, McClelland, Maier & Neustadt, P.C.

(57) ABSTRACT

A method for transmitting information included in a received packet to an upper layer of a node, including: judging whether or not a first packet satisfies a first condition, storing information which is information in the first packet and used as a part of or all of a second condition when the first packet is judged to satisfy the first condition, judging whether or not a second packet satisfies the second condition when the first packet is judged not to satisfy the first condition, and enabling information in the second packet to be transmitted to the upper layer of a node when the second packet is judged to satisfy the second condition.

12 Claims, 18 Drawing Sheets

| destination_ID | tlabel | rt | tcode | pri |
|---|---|---|---|---|
| source_ID | | | | |
| destination_offset | | | | |
| header_CRC | | | | |

READ REQUEST PACKET(quadlet read request)

| destination_ID | tlabel | rt | tcode | pri |
|---|---|---|---|---|
| source_ID | rcode | reserved | | |
| reserved | | | | |
| quadlet data | | | | |
| header_CRC | | | | |

READ RESPONSE PACKET(quadlet read response)

IEEE 1394 PROTOCOL CONFIGURATION

FLOWCHART IN BUS RESET

BUS CONSTITUTION EXAMPLE
AFTER SELF IDENTIFICATION

CONCEPT OF EUI-64 READ TRANSACTION

| destination_ID | tlabel | rt | tcode | pri |
|---|---|---|---|---|
| source_ID | | | | |
| destination_offset | | | | |
| quadlet data | | | | |
| header_CRC | | | | |

WRITE REQUEST PACKET(quadlet write request)

FIG.11

SCHEMATIC VIEW OF TABLE OF
NODE ID AND EUI-64

| NODE ID | EUI-64 |
|---|---|
| 16bit | 64bit |

| 0x0000 | 0xwwww_wwww_wwww_wwww |
|---|---|
| 0x0001 | 0xyyyy_yyyy_yyyy_yyyy |
| 0x0002 | 0xzzzz_zzzz_zzzz_zzzz |

CONSTITUTION EXAMPLE OF
CONFIGURATION ROM

| directory_length(4) | | CRC | |
|---|---|---|---|
| 0x12 | unit_spec_ID(0x00 005E) | | |
| 0x81 | textual descriptor offset(3) | | |
| 0x13 | unit_sw_version | | |
| 0x81 | textual descriptor offset(5) | | |
| textual_descriptor_length(3) | | CRC | |
| 0x0000_0000 | | | |
| 0x0000_0000 | | | |
| "I" | "A" | "N" | "A" |
| textual_descriptor_length(3) | | CRC | |
| 0x0000_0000 | | | |
| 0x0000_0000 | | | |
| "I" | "P" | "v" | "4" |

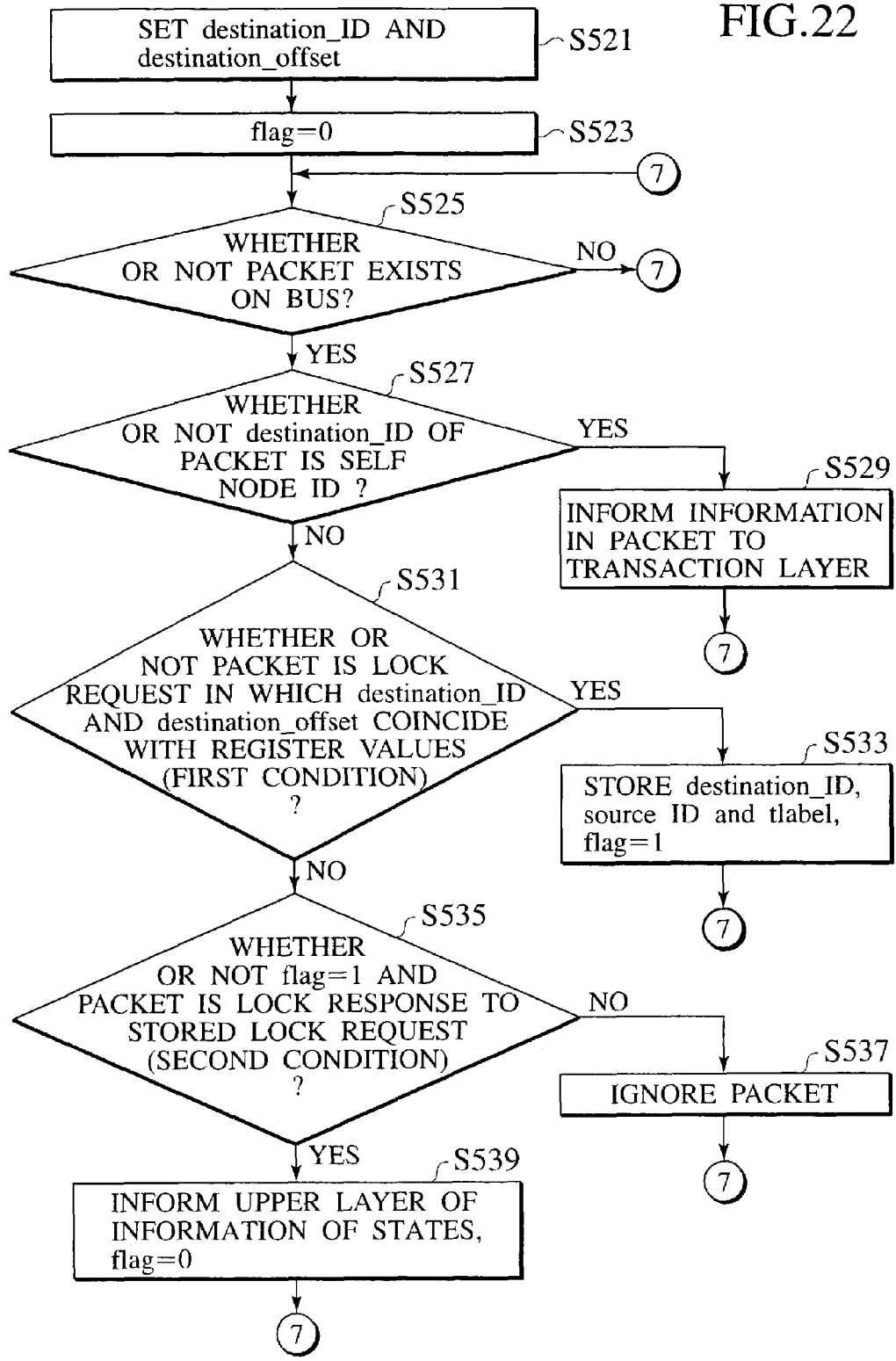

METHOD AND APPARATUS FOR TRANSMITTING TO AN UPPER LAYER OF INFORMATION INCLUDED IN A PACKET

CROSS REFERENCE TO RELATED APPLICATIONS

This application is based upon and claims the benefit of priority from prior Japanese Patent Application P2002-066010 filed on Mar. 11, 2002; the entire contents of which are incorporated by reference herein.

BACKGROUND OF THE INVENTION

1. Field of the Invention

The present invention relates to a communication method and an apparatus for transmitting to an upper layer of a node only those packets that satisfy a predetermined condition from among packets received by a lower layer of the node in accordance with a communication protocol having a hierarchy structure, such as IEEE 1394.

2. Description of the Related Art

IEEE 1394-1995 and IEEE 1394a-2000 are standards of a high-speed serial bus and support two types of transfers including an asynchronous transfer and an isochronous transfer.

When the asynchronous transfer is performed between nodes connected to a bus, a read request packet is sent from a read request node and a read response packet is sent from a read response node. In header portions of both of the read request packet and the read response packet, destination IDs (destination_ID) indicating destinations of the packets are stored.

In link layers of the respective nodes connected to the bus, when a packet is present on the bus, the packet is received via a physical layer interface, and a judgment or determination is made whether or not a destination ID stored in a header portion of the packet coincides with a node ID identifying each node.

When both IDs coincide with each other, information included in the packet is transmitted to a transaction layer that is an upper layer of the node.

However, there are two problems as described below in the conventional art. A first, description will be made of a first problem. In IEEE 1394, when a connection state of nodes changes due to insertion/withdrawal of a cable, bus reset occurs, and a node ID of each of the nodes may change. A new node ID of each node is judged or determined in the process of tree identification and self identification which will follow after the bus reset caused by the insertion/withdrawal of the cable. Moreover, all of the nodes store unduplicated data of 64 bits, which is called an EUI-64 (an extended unique identifier), in a specified address region in a configuration ROM, in order to specify the manufacturer of an apparatus and the like.

In an operation system supporting the IEEE 1394, after the bus reset, the tree identification and the self identification are completed, each node on the bus reads the EUI-64 of all nodes except for its own in order to identify the other nodes. A read transaction of a specified node to a specified address is started by sending a read request packet to a header portion of a packet, the read request packet storing a destination ID for specifying a node and a destination offset for specifying an address. A node that received the read request packet stores data of a requested address in a read response packet and sends the read response packet back. By the sending of the read request packet and the sending back of the read response packet, the read transaction is finished. After the bus reset, the tree identification and the self identification are completed, each node sends the read transactions of "the number of all nodes—1".

For example, when a first node, a second node and a third node exist, read request packets are sent as follows: (1) a read request packet, in which the second node is a destination ID, and a read request packet, in which the third node is the destination ID, are sent from the first node; (2) the read request packet, in which the third node is the destination ID, and a read request packet, in which the first node is the destination ID, are sent from the second node; and (3) the read request packet, in which the first node is the destination ID, and the read request packet, in which the second node is the destination ID, are sent from the third node. Specifically, six read request packets are sent in total.

In the case where data is exchanged between the specified two nodes before the bus reset by use of an upper protocol of the IEEE 1394 (e.g.: AV/C (Audio-Video/Control) SBP (Serial Bus Protocol)—2, DPP (Direct Print Protocol)), there is a possibility that the node ID will change after the bus reset. Thus, an EUI-64 value of each node is read after the bus reset, and a counterpart node with which the data has been exchanged before the bus reset is searched. Also in this case, an EUI-64 value of the counterpart node with which the data is exchanged is previously stored, and the read transaction, in which the EUI-64 values are the object to be read, is repeated until a node having an EUI-64 value equivalent to the foregoing EUI-64 value is found. When the node having the relevant EUI-64 value is found, a continuation of the transaction interrupted by the bus reset can be restarted.

When 63 nodes exist on the bus, and the read transaction designating the address, in which the EUI-64 is stored, is performed for all the nodes while each node changes its node ID from "0" to "the number of all nodes—1" after the bus reset, the read transaction will be performed a total of 62×63 times.

As described above, after the bus reset, the bus is likely to be congested by the read transaction of the EUI-64. Moreover, in the case where a node exists which is likely to be hung up when receiving read transactions from a number of nodes, there is a substantial possibility that a hang up will occur in the EUI-64 read transaction after the bus reset.

Next, description will be made of a second problem. As described above, the conventional link layer compares the self node ID to the destination ID included in the header of the packet on the bus and informs the transaction layer of only the packets in which both the IDs coincide with each other. That is, a node having the link layer receives the packet. Accordingly, when an arbitrary node a, for example, wants to know the state of a specified node b, a read request packet addressed to the node b from the node a must arrive at the node b and a read response packet addressed to the node a from the node b must arrive at the node a. Even if a node other than the node a (for example, node c) sends a read request packet to the node b and a read response packet addressed to the node c is sent from the node b to the bus, a link layer of the node a does not inform the read response packet addressed to the node c of an upper layer of the node a. Therefore, even if a read response packet having necessary information for the node a arrives at the link layer of the node a, the read response packet is not transmitted to the upper layer of the node a unless the packet is addressed to the node a.

As a result, when the node a cannot log into the node b because, for example, the number of nodes capable of establishing connection states with the node b in an upper application is determined and the maximum number of nodes capable of establishing the connection states therewith have already logged into the node b, the node a has to repeat the read transaction in order to check for the state of the node b until any one of the nodes already establishing the connection states with the node b cancel their connection states.

SUMMARY OF THE INVENTION

A first aspect of the present invention is a method for transmitting to an upper layer of a node information included in a received packet, including (a) judging or determining whether or not a first packet satisfies a first condition, (b) storing information contained in the first packet and used as a part of or all of a second condition when the first packet is judged or determined to satisfy the first condition, (c) judging or determining whether or not a second packet satisfies the second condition when the first packet is judged not to satisfy the first condition, and (d) enabling information in the second packet to be transmitted to the upper layer of the node when the second packet is judged to satisfy the second condition.

A second aspect of the present invention is a method for transmitting to an upper layer of a node information included in a received packet, including (a) previously storing in a storage unit a first destination ID and a first destination offset, (b) judging or determining whether or not a second destination ID of the packet coincides with the first destination ID, whether or not a second destination offset of the packet coincides with the first destination offset and whether or not a transaction code of the packet coincides with a write request transaction code, and (c) enabling the information included in the packet to be transmitted to the upper layer of a node when it is judged or determined that the second destination ID coincides with the first destination ID, that the second destination offset coincides with the first destination offset and that the transaction code coincides with the write request transaction code.

A third aspect of the present invention is an apparatus for transmitting to an upper layer of a node information included in a received packet, including (a) an extraction unit constituted to extract from first and second packets a part of or all of information included in the packets, (b) a storage unit constituted to store information necessary to judge or determine whether or not a first condition is satisfied and information necessary to judge or determination whether or not a second condition is satisfied, (c) a judgment or determination unit constituted to judge or determine whether or not the first packet satisfies the first condition and whether or not the second packet satisfies the second condition, and (d) a control unit constituted to allow the extraction unit to extract from the first packet the information necessary to judge or determine whether or not the first condition is satisfied, to allow the judgment or determination unit to judge or determine whether or not the first packet satisfies the first condition, to allow the storage unit to store information, which is information included in the first packet and used as a part of or all of the second condition, when the first packet satisfies the first condition, to allow the extraction unit to extract from the second packet the information necessary to judge or determine whether or not the second condition is satisfied when the first packet does not satisfy the first condition, to allow the judgment or determination unit to judge or determine whether or not the second packet satisfies the second condition and to enable a part of or all of information included in the second packet to be transmitted to the upper layer of a node when the second packet satisfies the second condition.

A fourth aspect of the present invention is an apparatus for transmitting to an upper layer of a node information included in a packet received, including: (a) an extraction unit constituted to extract a part of or all of the information included in the packet from the received packet, (b) a storage unit constituted to store information necessary to judge or determine whether or not the packet satisfies a condition for transmitting to the upper layer of a node (hereinafter referred to as an upper layer transmitting condition), (c) a judgment or determination unit constituted to judge or determine whether or not the packet satisfies the upper layer transmitting condition, and (d) a control unit constituted to allow the extraction unit to extract from the packet the information necessary to judge or determine whether or not the upper layer transmitting condition is satisfied, to allow the judgment or determination unit to judge or determine whether or not the packet satisfies the upper layer transmitting condition and to enable a part of or all of the information included in the packet to be transmitted to the upper layer of a node when the packet satisfies the upper layer transmitting condition.

BRIEF DESCRIPTION OF THE DRAWINGS

FIG. 11 is a schematic view showing a state where a node ID and an EUI-64 are stored in a register.

FIG. 16 is a view showing a constitution example of a configuration ROM.

FIG. 22 is a flowchart illustrating a processing in the modified example of the fifth embodiment of the present invention.

DETAILED DESCRIPTION OF EMBODIMENTS

Figures 1, 2, 3:
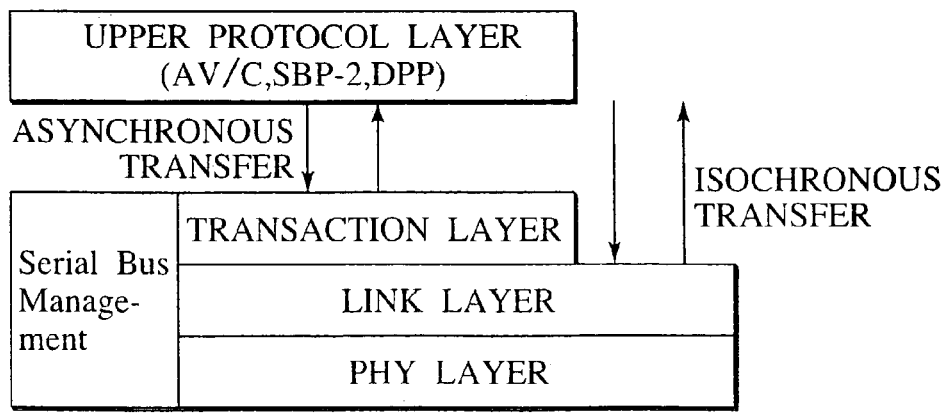
FIG. 1 is a view showing a format of a read request packet, which is transmitted/received in an embodiment of the present invention.
FIG. 2 is a view showing a format of a read response packet, which is transmitted/received in the embodiment of the present invention.
FIG. 3 is a view showing a configuration of an IEEE 1394 protocol used in the embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

As shown in FIG. 1, a read request packet, which is transmitted/received in an embodiment to be described later, includes respective fields of: a destination ID (destination_ID); a transaction label (tlabel); a retry code (rt); a transaction code (tcode); a priority (pri); a source ID (source ID); a destination offset (destination_offset); and a header CRC (header_CRC).

As shown in FIG. 2, a read response packet, which is transmitted/received in the embodiment to be described later, includes respective fields of: a destination ID; a transaction label; a retry code; a transaction code; a priority; a source ID; a response code (rcode); a reservation (reserved); a quadlet (quadlet data); and a header CRC.

As shown in FIG. 3, a protocol layer in the embodiment to be described later is composed of: a physical layer; a link layer; a transaction layer; a serial bus control layer; and an upper protocol layer. An upper protocol includes an AV/C (audio video control), a SBP (serial bus protocol)-2 and a DPP (direct print protocol).

Figure 4:
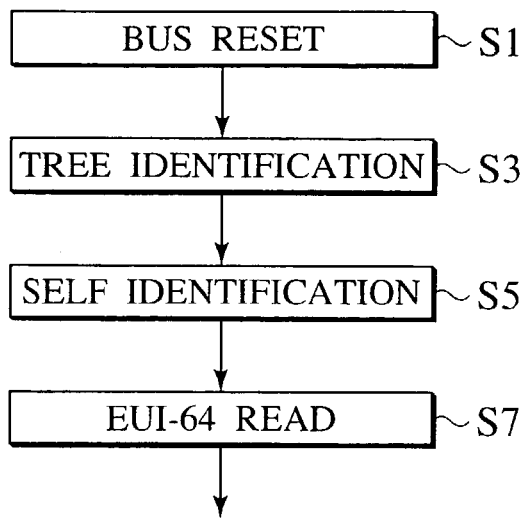
FIG. 4 is a flowchart illustrating a processing from bus reset to EUI-64 read.

As shown in FIG. 4, in the embodiment to be described later, when bus reset occurs (S1), identification of a tree structure (S3), self identification (S5) and EUI-64 read (S7) are performed. The bus reset is a result of insertion/withdrawal of a cable and the like. The identification of the tree structure specifies respective ports of all nodes as a parent port or a child port. After the identification process of the tree structure is completed, the self identification process is started. During the self identification, a self ID packet is transmitted from each node, thus judging or determining node IDs and the number of nodes on the bus. Then, an EUI-64 for specifying an apparatus of the nodes is read, thus associating the node IDs with the apparatus. The EUI-64 has a value of 64 bits, which is generated by coupling together a node vendor ID (node_vendor_ID), a chip ID high (chip_id_hi) and a chip ID low (chip_id_lo).

Figure 5:
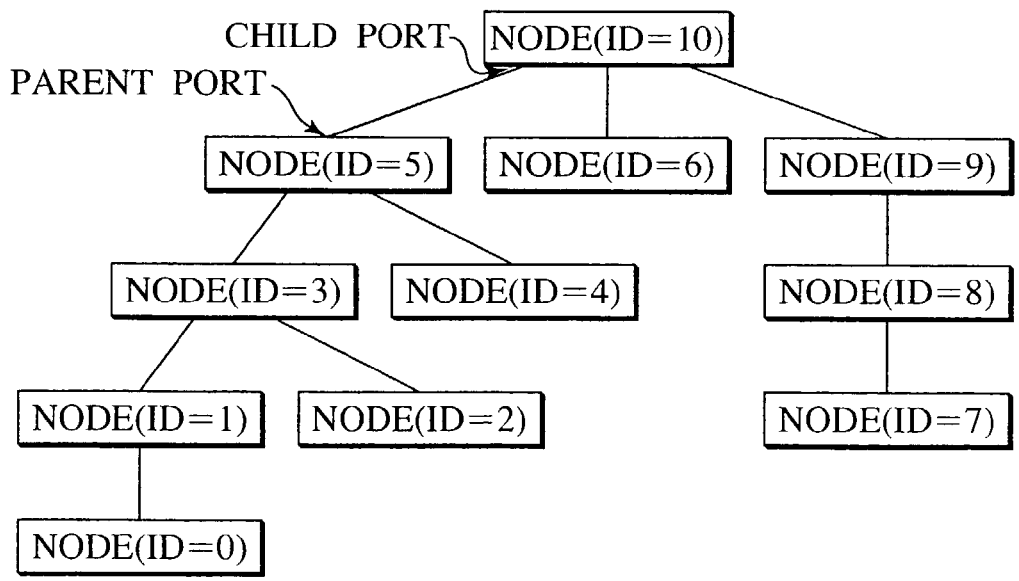
FIG. 5 is a view showing a constitution example of a bus after self identification.

As shown in FIG. 5, after the self identification, ID numbers are allocated to the respective nodes. In FIG. 5, an example is shown, in which: a child port of a node of ID=10 is connected with parent ports of respective nodes of ID=5, 6 and 9; a child port of the node of ID=5 is connected with parent ports of respective nodes of ID=3 and 4; a child port of the node of ID=3 is connected with parent nodes of respective nodes of ID=1 and 2; a child port of the node of ID=1 is connected with a parent port of a node of ID=0; a child port of the node of ID=9 is connected with a parent port of a node of ID=8; and a child port of the node of ID=8 is connected with a parent port of a node of ID=7.

Figure 6:
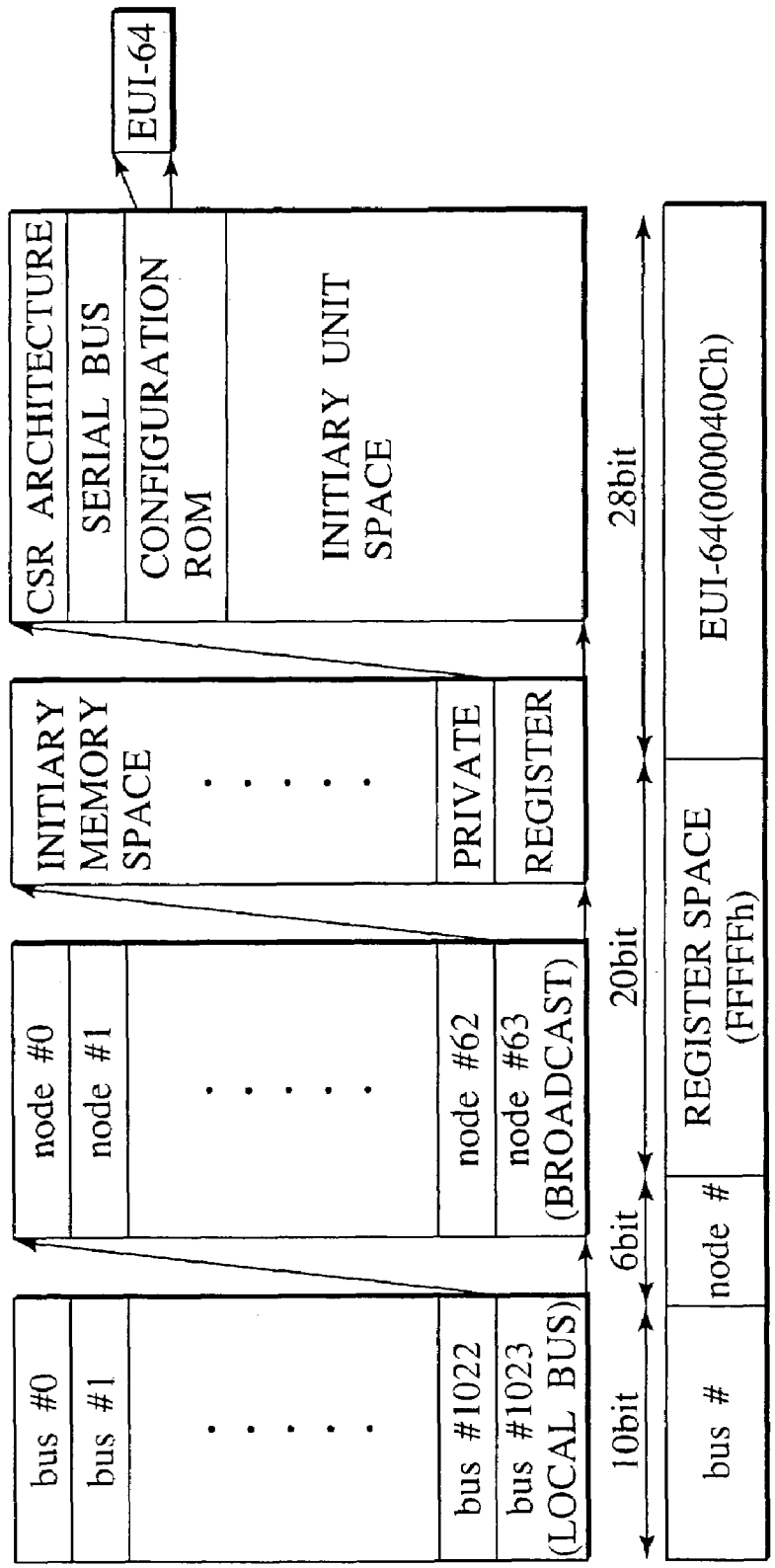
FIG. 6 is a view showing an address specification of a serial bus and an address of an EUI-64.

As shown in FIG. 6, a group composed of 64 nodes is allocated to each of the buses counting to 1024. Each of the nodes has an address space of 256 Tbytes. Each address space is divided into an initial memory space, a private space and an initial register space. The initial register space is divided into a CSR (control and status register) architecture space, a serial bus space, a configuration ROM space and an initial unit space. In the configuration ROM space, the EUI-64 is stored.

Figures 7, 8:
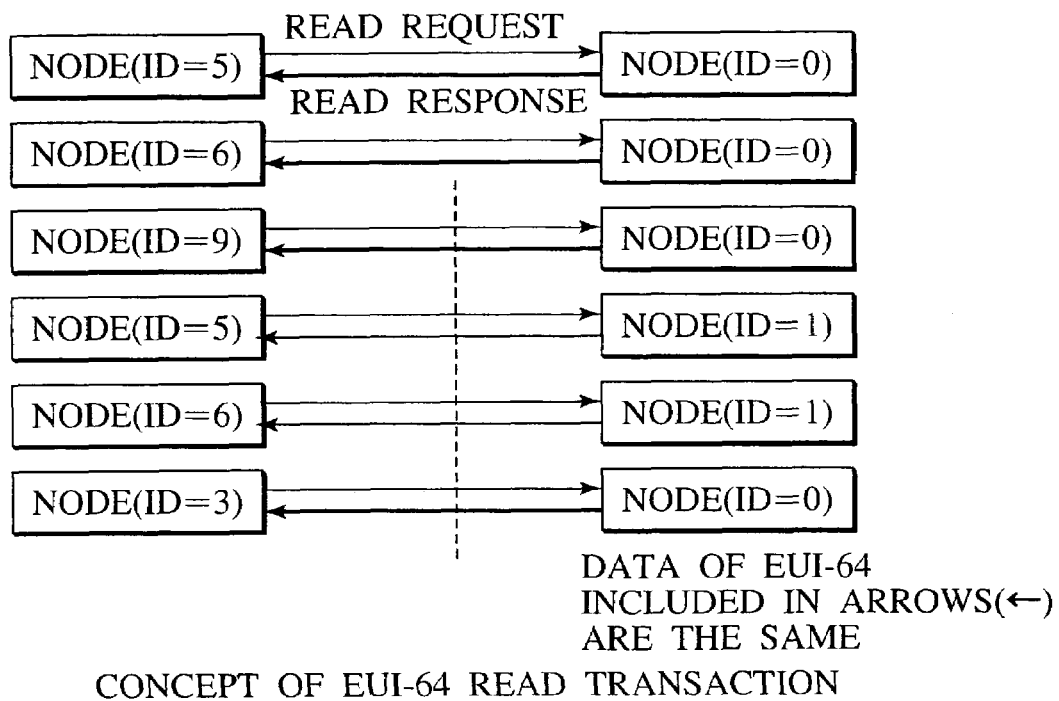
FIG. 7 is a view showing a concept of an EUI-64 read transaction.
FIG. 8 is a view showing a format of a write request packet used in the embodiment of the present invention.

As shown in FIG. 7, when a read request packet is sent from the node of ID=5 to the node of ID=0, a read response packet is sent from the node of ID=0 to the node of ID=5. Similarly, when a read request packet is sent from the node of ID=6 to the node of ID=0, a read response packet is sent from the node of ID=0 to the node of ID=6. Moreover, when a read request packet is sent from the node of ID=9 to the node of ID=0, a read response packet is sent from the node of ID=0 to the node of ID=9. Furthermore, when a read request packet is sent from the node of ID=3 to the node of ID=0, a read response packet is sent from the node of ID=0 to the node of ID=3. The EUI-64 included in each of the foregoing four read response packets sent from the node of ID=0 has identical data. In the embodiment to be described later, it is possible to eliminate the sending of a plurality of packets including such identical data.

As shown in FIG. 8, a write request packet, which is transmitted/received in the embodiment to be described later, includes respective fields of: a destination ID; a transaction label; a retry code; a transaction code; a priority; a source ID; a destination offset; a quadlet data; and a header CRC.

First Embodiment

In a first embodiment, by obtaining necessary information from a packet addressed to another packet instead of from a packet addressed to a self node, it is possible to inform an upper layer of a node of correspondence between a node ID of each node and an EUI-64.

Figure 9:
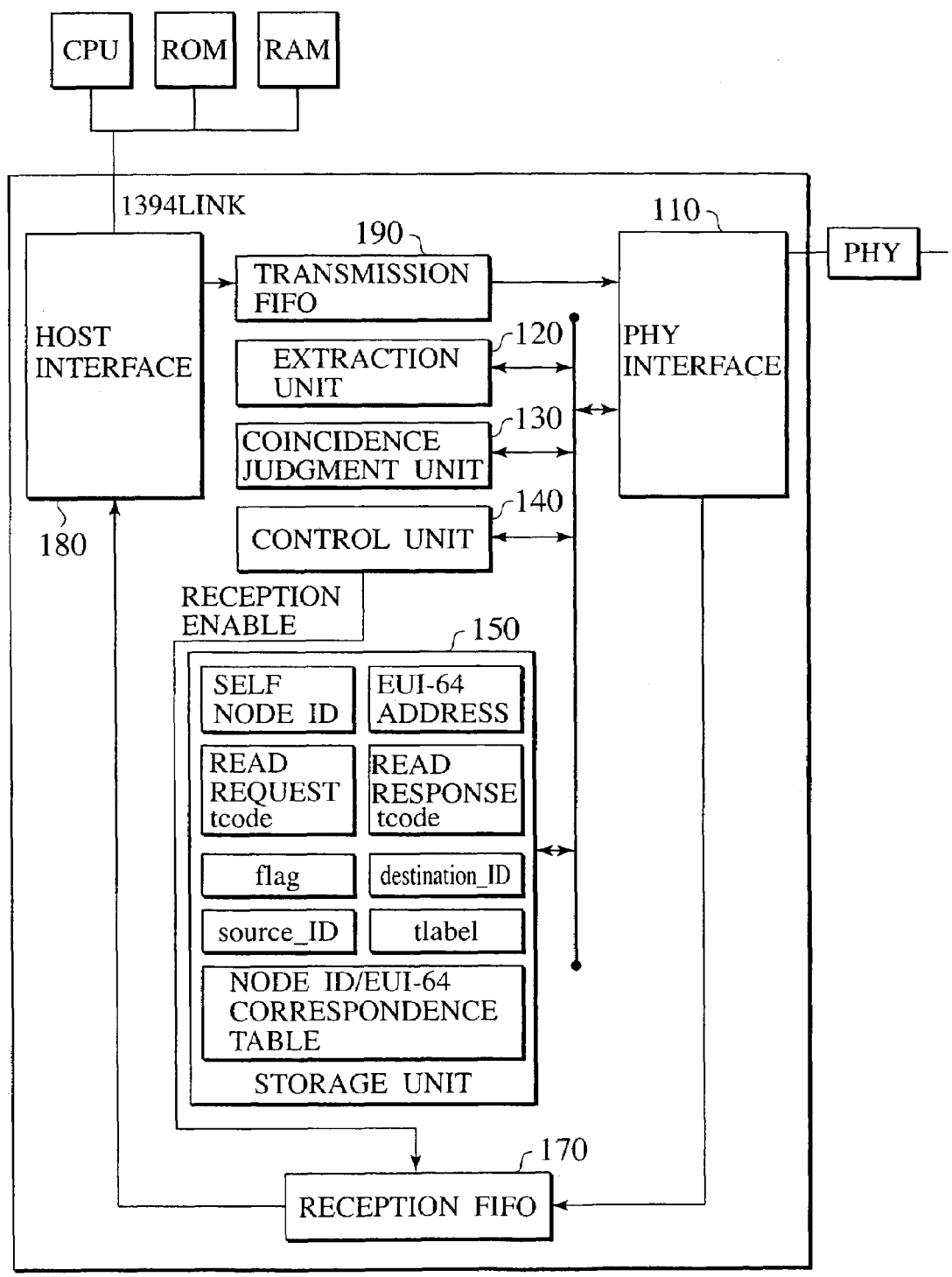
FIG. 9 is a block diagram showing a constitution of a packet transmitter-receiver according to a first embodiment of the present invention.

As shown in FIG. 9, a link layer includes: a PHY (physical layer) interface 110; an extraction unit 120; a coincidence judgment or determination unit 130; a control unit 140; a storage unit 150; a reception FIFO 170; a host interface 180; and a transmission FIFO 190.

From a packet on a bus, the extraction unit 120 extracts a destination ID, a destination offset, a transaction code, a source ID and a transaction label. Details of the above terms are defined in the IEEE1394.

The storage unit 150 stores a self node ID, an address of the EUI-64, a read request code, a read response code, the destination ID, the destination offset, the source ID, the transaction label and the like. A static random access memory (SRAM); a dynamic random access memory (DRAM); and the like may be used as the storage unit 150. The destination ID and the destination offset and the like may be stored physically in one memory or may be stored in two or more memories, which are physically separate from each other.

The coincidence judgment unit 130 compares, for example, the destination ID extracted from the packet on the bus by the extraction unit 120 with the self node ID stored in the storage unit 150 and outputs a signal indicating whether or not both of the IDs coincide with each other.

The control unit 140 controls what is extracted from the packet on the bus by the extraction unit 120, what is stored by the storage unit 150 and what is compared with what by the coincidence judgment unit 130. With reference to a flowchart of FIG. 10, description will be made below of specific contents of how the control unit 140 controls the extraction unit 120.

The self node ID, the EUI-64 address, a read request transaction code and a read response transaction code are previously stored in the storage unit 150.

Figure 10:
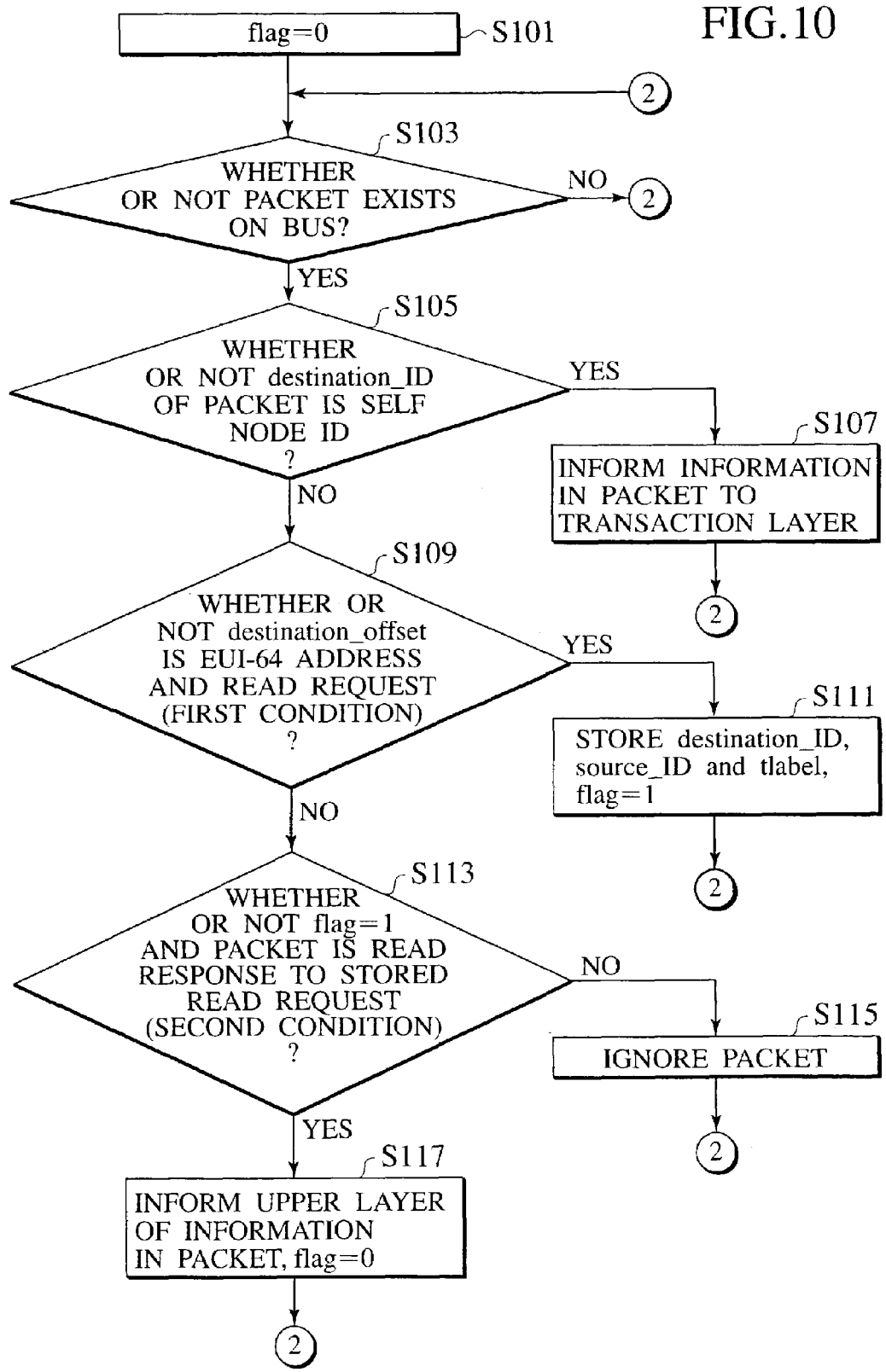
FIG. 10 is a flowchart illustrating a processing in the first embodiment of the present invention.

As shown in FIG. 10, a flag=0 is first set in Step S101. Specifically, 0 is written into a flag register of the storage unit. Then, in Step S103, it is checked whether or not the packet exists on the bus.

If the result of Step S103 is YES, it is checked whether or not the destination ID of the packet coincides with the self node ID in Step S105. Specifically, the control unit 140 allows the extraction unit 120 to extract the destination ID from the packet on the bus, and also allows the coincidence judgment unit 130 to compare the extracted destination ID with the stored self node ID.

If the result of Step S105 is YES, information in the packet is transmitted to a transaction layer in Step S107. In other words, a reception enable signal is sent to the reception FIFO 170.

If the result of Step S105 is NO, in Step S109, it is checked whether or not the destination offset of the packet on the bus is the EUI-64 address and the transaction code of the packet on the bus is the read request code (a first condition). Specifically, the control unit 140 allows the extraction unit 120 to extract the destination offset and the transaction code from the packet on the bus and allows the coincidence judgment unit 130 to (1) compare the extracted destination offset with the stored EUI-64 address and then to (2) compare the extracted transaction code with the stored read request code.

If the result of Step S109 is YES, in Step S111, the destination ID, the source ID and the transaction label of the packet (a first packet) on the bus are stored, and the flag is set to 1. Specifically, the control unit 140 allows the extraction unit 120 to extract the destination ID, the source ID and the transaction label from the packet on the bus (a first packet). Moreover, the control unit 140 writes 1 into the flag register of the storage unit 150, the extracted destination ID into a destination ID register, the extracted source ID into a source register, and the extracted transaction label into a transaction label register. Then, the processing returns to Step S103, and Steps S105 and S109 are repeated.

If the result of Step S109 is NO, in Step S113, it is checked whether or not (1) the flag is 1 (flag=1) and (2) the packet on the bus is a read response packet for the read request packet stored in Step S111 (a second condition).

Specifically, it is checked whether or not 1 is written into the flag register of the storage unit 150, and the extraction unit 120 is allowed to extract a destination ID, a source ID, a transaction label and a transaction code from a packet (a second packet) on the bus. Moreover, the coincidence judgment unit 130 is allowed to compare (1) the destination ID of the second packet on the bus with the source ID of the first packet, which is stored in Step S111, (2) the source ID of the second packet on the bus with the destination ID of the first packet, which is stored in Step S111, (3) the transaction label of the second packet on the bus with the transaction label of the first packet, which is stored in Step S111, and (4) the transaction code of the second packet on the bus with the previously stored read response code.

If the result of Step S113 is NO, the packet on the bus is ignored in Step S115.

If the result of Step S113 is YES, in Step S117, information in the second packet on the bus is transmitted to the upper layer, and the value of the flag is set back to 0. Specifically, the reception enable signal is sent to the reception FIFO 170, and flag=0 is written into the storage unit 150.

After Step S117, the source ID (a node ID shown in FIG. 11) and the value of the EUI-64 in the read response packet on the bus are associated with each other as shown in FIG. 11, and are stored in a node ID/EUI-64 correspondence table register of the storage unit 150. The foregoing processing is repeated, and thus a correspondence table between the node IDs and EUI-64 values of the all nodes on the bus can be prepared.

As described above, in the first embodiment, even in the case of the read response packets addressed to the other nodes, the read response packet for the read request packet in which the destination offset is the EUI-64 address is transmitted to the upper layer of a node. As a result, the number of packets, which must be transmitted/received on the bus in order for each node to obtain information of the other nodes, is reduced.

In the following comparison, for example, a first node a, a second node b and a third node c transmit/receive packets via the bus and thus each of the nodes obtains information related to the other nodes. Heretofore, after the bus reset, the following 12 packets have been sent to the bus, including:
(1) a read request packet from the node a to the node b;
(2) a read response packet from the node b to the node a;
(3) a read request packet from the node a to the node c;
(4) a read response packet from the node c to the node a;
(5) a read request packet from the node b to the node c;
(6) a read response packet from the node c to the node b;
(7) a read request packet from the node b to the node a;
(8) a read response packet from the node a to the node b;
(9) a read request packet from the node c to the node a;
(10) a read response packet from the node a to the node c;
(11) a read request packet from the node c to the node b; and
(12) a read response packet from the node b to the node c.

However, according to the first embodiment, it is satisfactory that only after the bus reset, only the following 6 packets are sent to the bus, including:
(1) a read request packet from the node a to the node b;
(2) a read response packet from the node b to the node a;
(3) a read request packet from the node a to the node c;
(4) a read response packet from the node c to the node a;
(5) a read request packet from the node b to the node a; and
(6) a read response packet from the node a to the node b.

The reason for the reduced correspondence is as follows. Specifically, the read response packet from the node b to the node a informs not only the node a but also the node c of information related to the node b. Moreover, the read response packet from the node c to the node a informs not only the node a but also the node b of information related to the node c. Furthermore, the read response packet from the node a to the node b informs not only the node b but also the node c of information related to the node a.

As described above, according to the first embodiment, each node can inform the upper layer of a node of packets necessary for the upper layer of the node, even if the packets are the packet not addressed to the node. Therefore, since the total number of the packets, which are sent to the bus in order for each node to obtain information related to all the nodes after the bus reset, is reduced, the congestion in the bus can be eased. Then, when the total number of the packets is reduced, time necessary for each node to obtain the information related to the other nodes is shortened. As a result, it is possible to move quickly to a state of transferring actual data. The actual data does not mean data transmitted/received in order to grasp connection relationships between the respective nodes and the like, but means data transmitted/received after the connection relationships therebetween and the like are grasped. To be specific, the actual data includes video data, voice data and the like. With respect to an apparatus which would become hung up when receiving read transactions from a plurality of nodes, the read transactions are reduced, resulting in a decrease of incidents in which hang-ups occur.

Second Embodiment

In a second embodiment, it is possible to inform an upper layer of a node of a node ID, which has been transmitting/receiving packets before bus reset, by obtaining necessary information not from a packet addressed to a self node, but from packets addressed to other nodes. Specifically, based on a value of an EUI-64, which does not change before or after the bus reset, the node ID of the node after the bus reset, the node having been transmitting/receiving the packets before the bus reset, is transmitted to the upper layer of another node.

Figure 12:
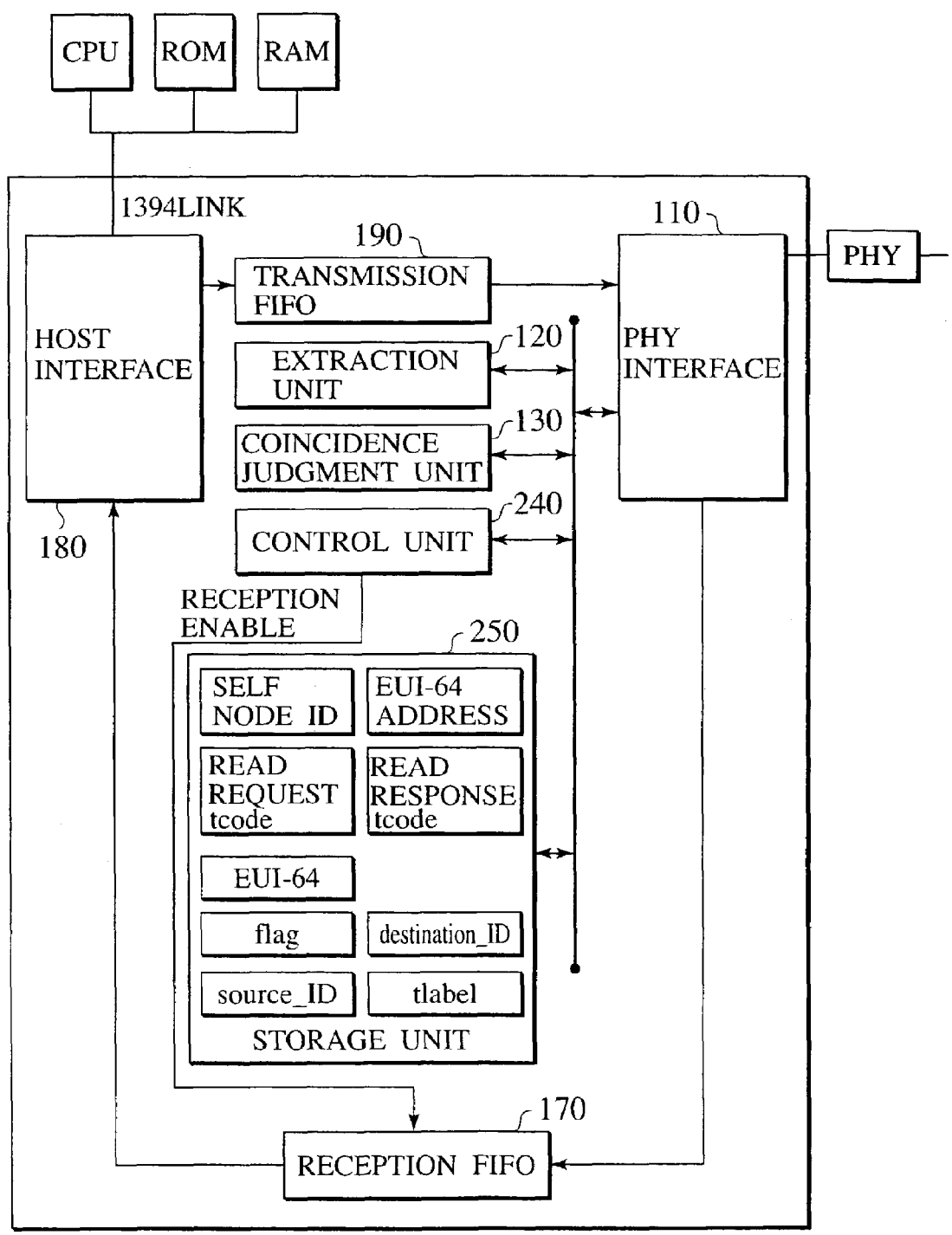
FIG. 12 is a block diagram showing a constitution of a packet transmitter-receiver according to a second embodiment of the present invention.

As shown in FIG. 12, a self node ID, an EUI-64 address, a read request transaction code, a read response transaction code, an EUI-64, a flag, a destination ID, a source ID and a tlabel are stored in a storage unit 250. The self node ID, the EUI-64 address, the read request transaction code and the read response transaction code are stored in the storage unit 250 before the reception of the packets.

Figure 13:
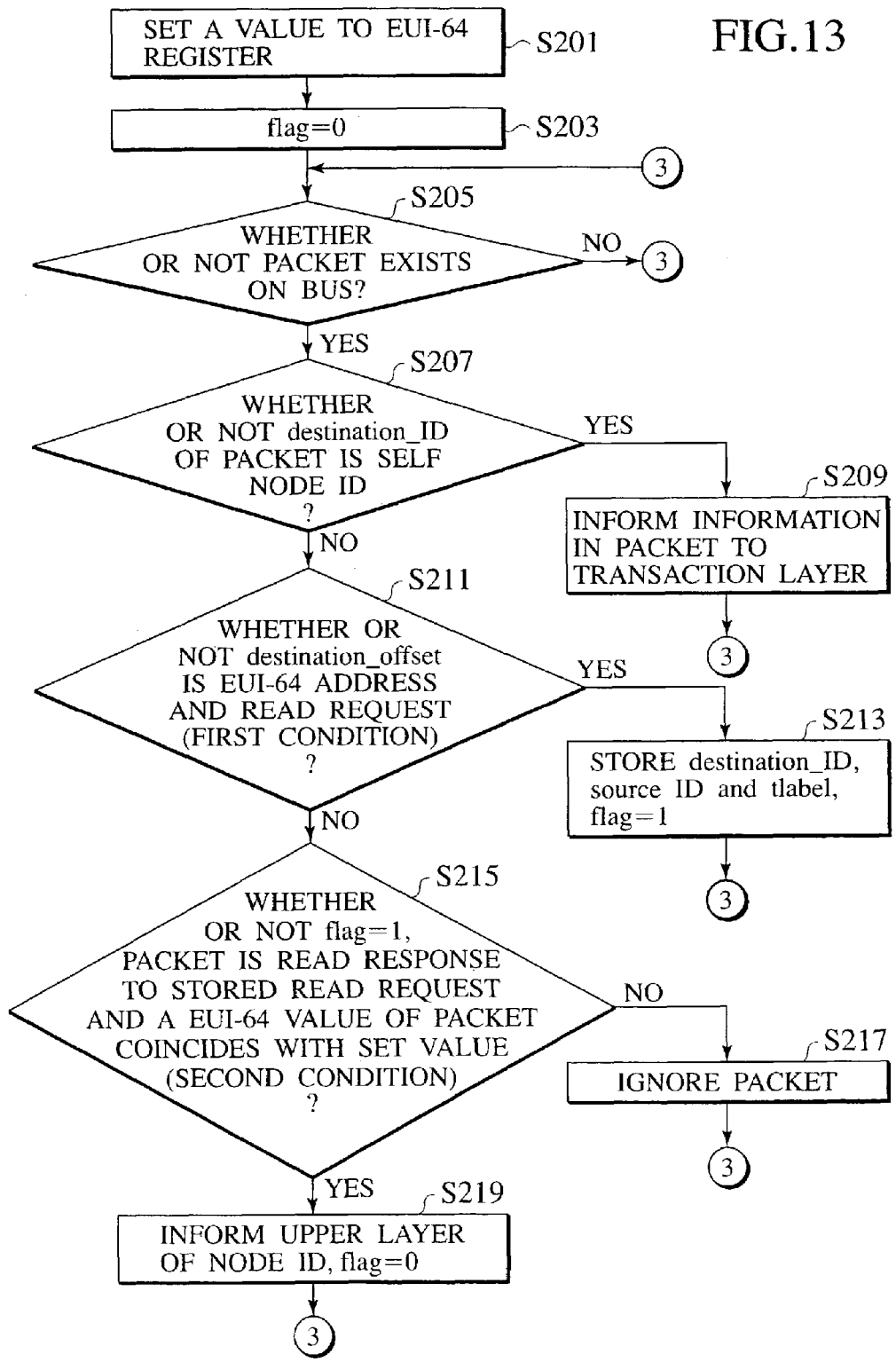
FIG. 13 is a flowchart illustrating a processing in the second embodiment of the present invention.

As shown in FIG. 13, in the second embodiment, a value is first set in an EUI-64 register in Step S201. Specifically, a value of an EUI-64 of a node, which has sent a packet received immediately before the bus reset, is stored in the EUI-64 register of the storage unit 250. As described above, the node ID of each node may change before or after the bus reset, but the value of the EUI-64 does not change.

Next, the flag is set to 0 in Step S203. Then, it is checked whether or not a packet exists on the bus in Step S205, and if the packet exists thereon, it is checked whether or not a destination ID of the packet coincides with the self node ID in Step S207.

If the result of Step S207 is YES, information in the packet is transmitted to a transaction layer in Step S209.

If the result of Step S207 is NO, it is checked in Step S211 whether or not a destination offset of the packet on the bus is an EUI-64 address and a transaction code of the packet on the bus is a read request code (a first condition).

If the result of Step S211 is YES, the destination ID, the source ID and the transaction label of the packet (a first packet) on the bus are stored in Step S213, and the flag is set to 1. Then, the processing returns to Step S205, and Steps S207 and S211 are repeated.

If the result of Step S211 is NO, it is checked in Step S215 whether or not (1) the flag is equal to 1, (2) a packet (a second packet) on the bus is a read response packet for the stored read request packet, and (3) the EUI-64 value of the packet (a second packet) on the bus coincides with the value set in the EUI-64 register (a second condition).

Specifically, it is checked whether or not 1 is written into the flag register of the storage unit 250, and the extraction unit 120 is allowed to extract a destination ID, a source ID, a transaction label and a transaction code from the packet (a second packet) on the bus. Moreover, the coincidence judgment unit 130 is allowed to compare (1) the destination ID of the second packet on the bus with the source ID extracted from the first packet, which is stored in Step S213, (2) the source ID extracted from the second packet on the bus with the destination ID of the first packet, which is stored in Step S213, (3) the transaction label extracted from the second packet on the bus with the transaction label of the first packet, which is stored in Step S213, (4) the transaction code extracted from the second packet on the bus with the previously stored read response code, and (5) value of the EUI-64 of the second packet on the bus with the value set in the EUI-64 register in Step S201.

If the result of Step S215 is NO, the packet on the bus is ignored in Step S217.

If the result of Step S215 is YES, in Step S219, the source ID of the packet on the bus is transmitted to the upper layer of a node, and the flag is set back to 0.

According to the second embodiment, by storing read response packets addressed to other nodes, a counterpart node can be determined, with which the packets are exchanged immediately before the bus reset.

An assumption is made, for example, that a first node a, a second node b and a third node c exist and that the node a and the node b exchange packets therebetween immediately before the bus reset. Then, it is assumed that when node IDs are changed by the bus reset, the node a becomes a node x, the node b becomes a node y and the node c becomes a node z. In order to restart the exchange of the packets, which is interrupted by the bus reset, the node x needs to recognize that the node b before the bus reset has become the node y after the bus reset.

The node ID of each node may be changed by the bus reset. However, since the value of the EUI-64 does not change, by comparing the value of EUI-64 of the node b with the EUI-64 value of the node y, the node x can recognize that the node y is the node b before the bus reset.

Conventionally, in order for the node x to know the EUI-64 value of the node y, it was necessary that the node x sends a read request packet addressed to the node y, in which a destination offset is an EUI-64 address, to the bus and that in response to the read request packet, the node y sends a read response packet addressed to the node x to the bus.

However, according to the second embodiment, the node x can recognize that the node y is the node b before the bus reset by confirming that (1) a destination offset of a read request packet addressed to the node y, the packet being sent from the node z to the bus, is an address of EUI-64 and (2) quadlet data of a read response packet addressed to the node z, the packet being sent from the node y to the bus in response to the read request packet, coincides with the EUI-64 value of the node b, which is stored before the bus reset.

As described above, according to the second embodiment, a reception condition of the read request packet is set so that (1) the destination offset is the EUI-64 address, and a reception condition of the read response packet is that (2-1) the read response packet is the one for the foregoing read request packet and (2-2) the quadlet data of the read response packet has a specific value (a value equivalent to the value set in the EUI-64 register). Thus, it is possible to know the node ID of the node, which had transmitted/received packets immediately before the bus reset from read response packets addressed to other nodes. Moreover, with respect to an apparatus that hangs up when receiving read transactions from a plurality of nodes, the read transactions are reduced, resulting in a decrease of hang-up incidents.

Third Embodiment

In a third embodiment, it is possible to inform an upper layer of a node ID of a node supporting a specific upper protocol by obtaining necessary information from packets addressed to other nodes instead of from a packet addressed to a self or first node.

Figure 14:
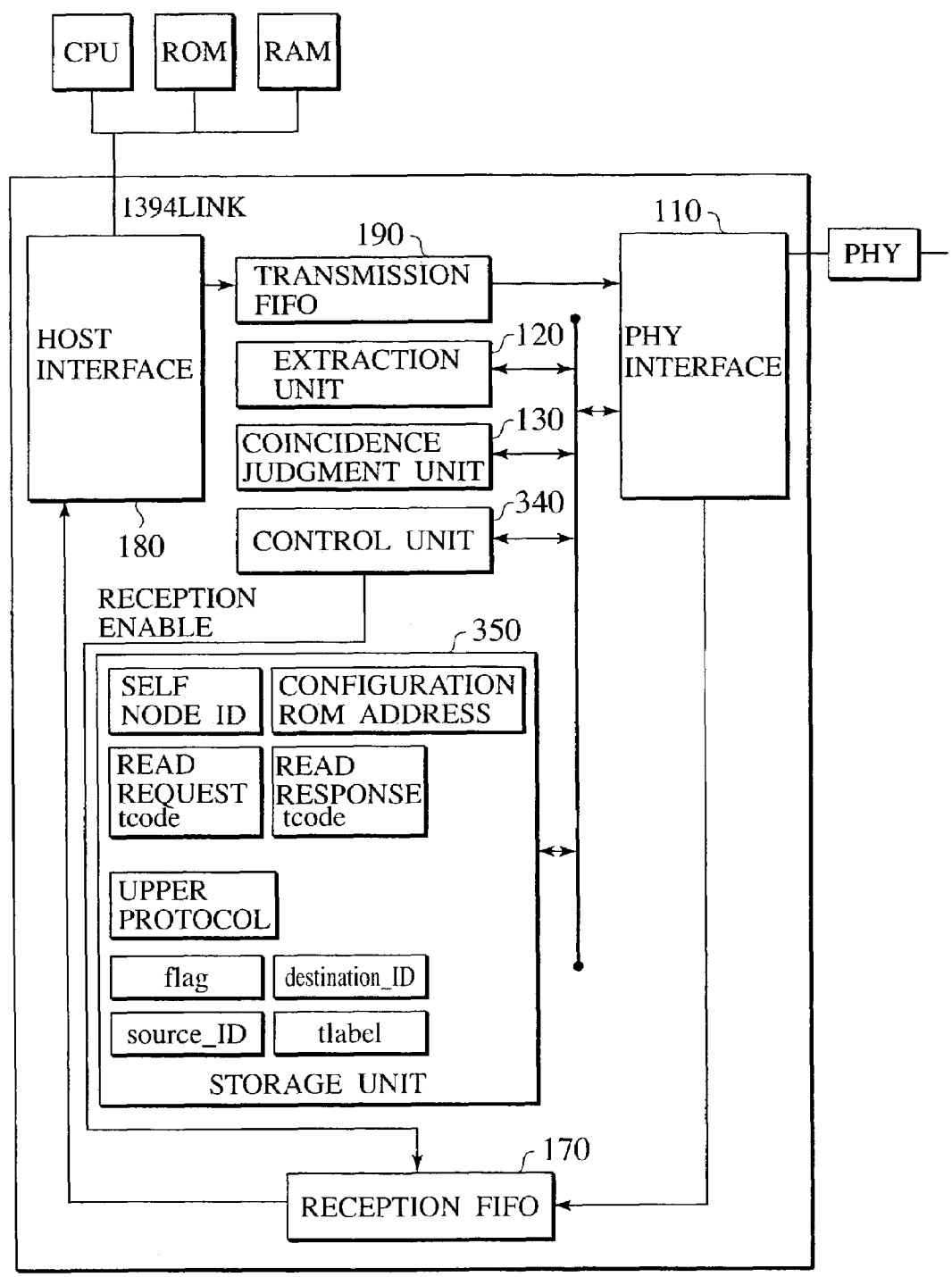
FIG. 14 is a block diagram showing a constitution of a packet transmitter-receiver according to a third embodiment of the present invention.

As shown in FIG. 14, a self or first node ID, a configuration ROM address, a read request transaction code, a read response transaction code, an upper protocol, a flag, a destination ID, a source ID and a tlabel are stored in a storage unit 350. The self node ID, the configuration ROM address, the read request transaction code and the read response transaction code are stored in the storage unit 350 prior to reception of packets.

Figure 15:
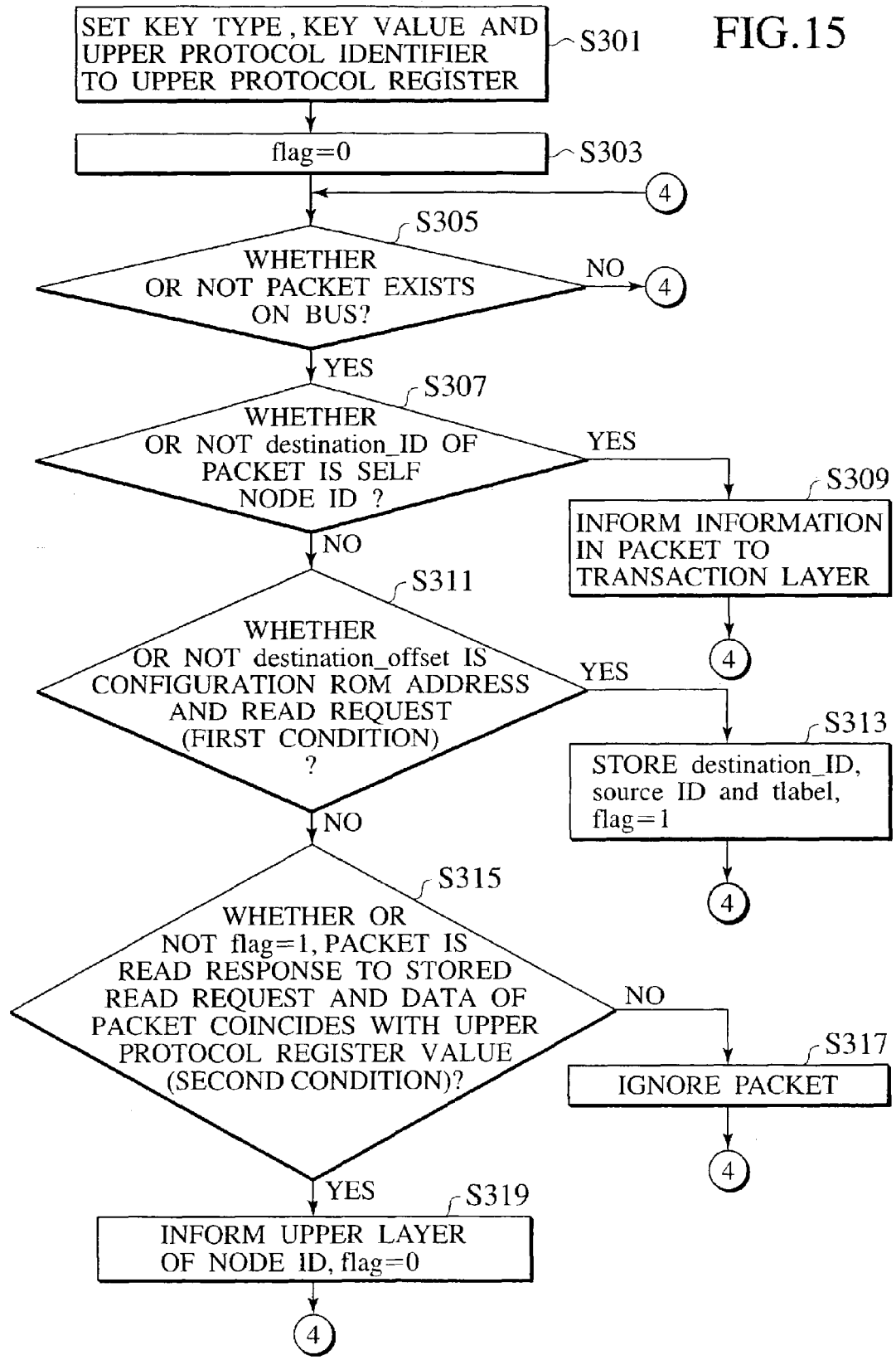
FIG. 15 is a flowchart illustrating a processing in the third embodiment of the present invention.

As shown in FIG. 15, in the third embodiment, a value is first set in an upper protocol register in Step S301. Specifically, a key type, a key value and an upper protocol that one desires to use are set in the protocol register. The contents of the setting of the register are used for determining a node supporting the same protocol. The key type defines a characteristic of an entry value (entry_value), and the key value specifies contents and a name of each ROM directory item. An example of the configuration ROM will be shown in FIG. 16. For example, in "00010010" representing binary digits of "0x12", the high 2 bits "00" represent the key type, and the low 6 bits "010010" represent the key value.

Next, the flag is set to 0 in Step S303. Then, it is checked whether or not a packet exists on the bus in Step S305, and if the packet exists on the bus, it is checked in Step S307 whether or not a destination ID of the packet coincides with the self node ID.

If the result of Step S307 is YES, information in the packet is transmitted to a transaction layer in Step S309.

If the result of Step S307 is NO, it is checked in Step S311 whether or not a destination offset of the packet on the bus is an address of the configuration ROM and a transaction code is a read request code (a first condition).

If the result of Step S311 is YES, the destination ID, the source ID and the transaction label of the packet (first packet) on the bus are stored in Step S313, and the flag is set to 1. Then, the processing returns to Step S305, and Steps S307 and S311 are repeated.

If the result of Step S311 is NO, it is checked in Step S315 whether or not (1) the flag is set to 1, (2) a packet (a second packet) on the bus is a read response packet for the read request packet stored in Step S313 and (3) data of the packet (a second packet) on the bus coincides with the value set in the upper protocol register in Step S301 (a second condition).

Specifically, it is checked whether or not 1 is written into the flag register of the storage unit 350, and the extraction unit 120 is allowed to extract a destination ID, a source ID, a transaction label, a transaction code, and data from the packet (second packet) on the bus. Moreover, the coincidence judgment unit 130 is allowed to compare (1) the destination ID extracted from the second packet on the bus with the source ID of the first packet, which is stored in Step S313, (2) the source ID extracted from the second packet on the bus with the destination ID of the first packet, which is stored in Step S313, (3) the transaction label extracted from the second packet on the bus with the transaction label of the first packet, which is stored in Step S313, (4) the transaction code extracted from the second packet on the bus with the previously stored read response code and (5) the data of the second packet on the bus with the value set in the upper protocol register in Step S301.

If the result of Step S315 is NO, the packet on the bus is ignored in Step S317.

If the result of Step S315 is YES, in Step S319, the source ID of the packet on the bus is transmitted to the upper layer of the node, and the flag is set back to 0.

As shown in FIG. 16, in the configuration ROM, information indicating performance of an apparatus is stored in addition to the EUI-64. A support state of the upper protocol (AV/C, SBP-2, DPP or the like) is one type of such information.

As described above, according to the third embodiment, a reception condition of a read request packet is that (1) the destination offset is the address of the configuration address, and a reception condition of a read response packet is that (2-1) the read response packet is the packet for the foregoing read request packet and (2-2) a key type and a key value, both of which are included in quadlet data, have specific values. Thus, even in the case of read response packets addressed to other nodes, it is possible to inform the upper layer of a node of a read response packet in which the node ID of the node supporting the specific upper protocol is the source ID.

Fourth Embodiment

In a fourth embodiment, it is possible to inform an upper layer of a node of a state of a specific node by obtaining necessary information from packets addressed to other nodes instead of form a packet addressed to a self or first node. The "state of the node" means a state where a predetermined processing is in operation or a state where the predetermined processing is finished. The state of the node includes a state, for example, where a print processing is finished.

Figure 17:
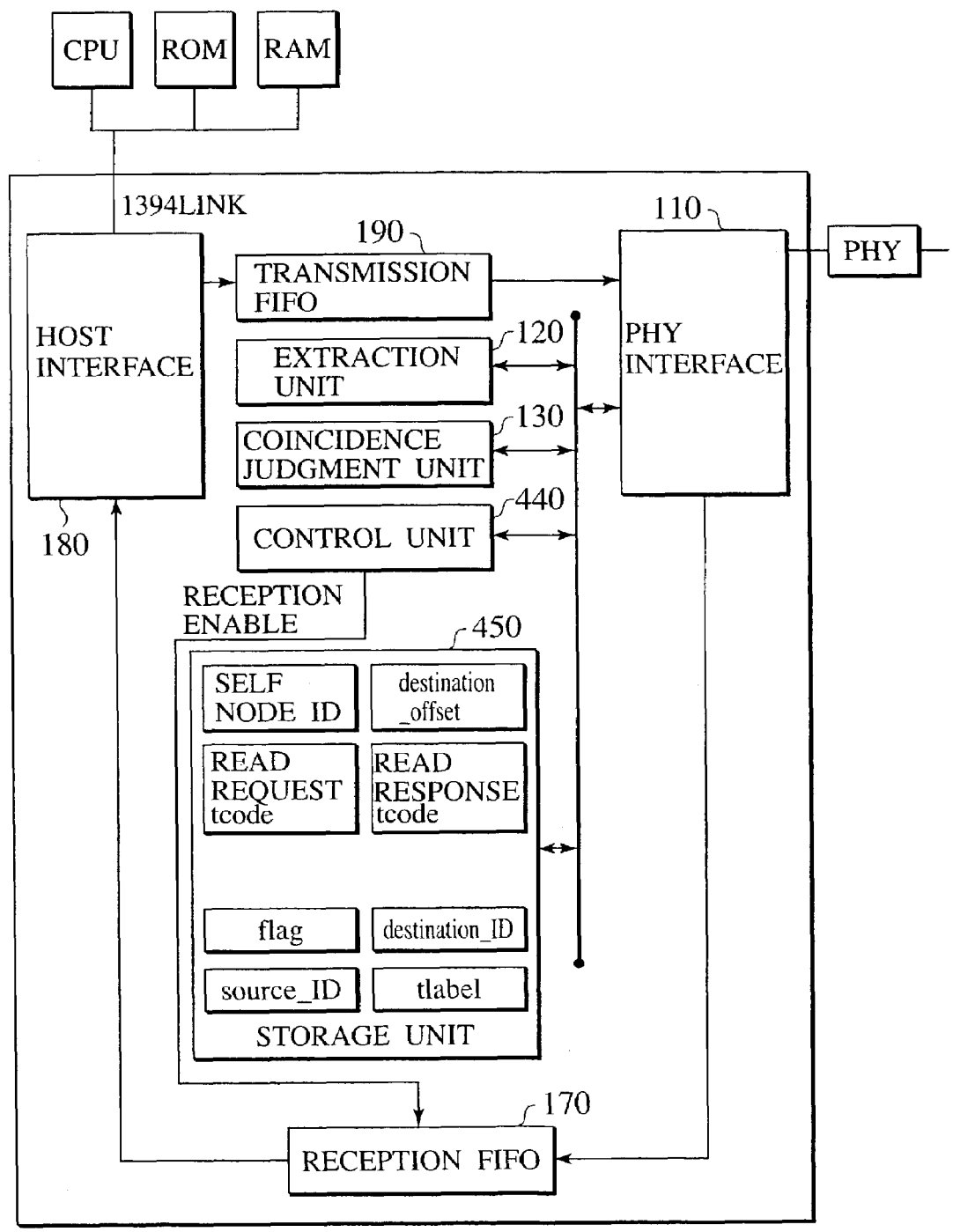
FIG. 17 is a block diagram showing a constitution of a packet transmitter-receiver according to a fourth embodiment of the present invention.

As shown in FIG. 17, a self node ID, a destination offset, a read request transaction code, a read response transaction code, a flag, a destination ID, a source ID and a tlabel are stored in a storage unit 450. The self node ID, the read request transaction code and the read response transaction code are stored in the storage unit 450 before reception of packets.

Figure 18:
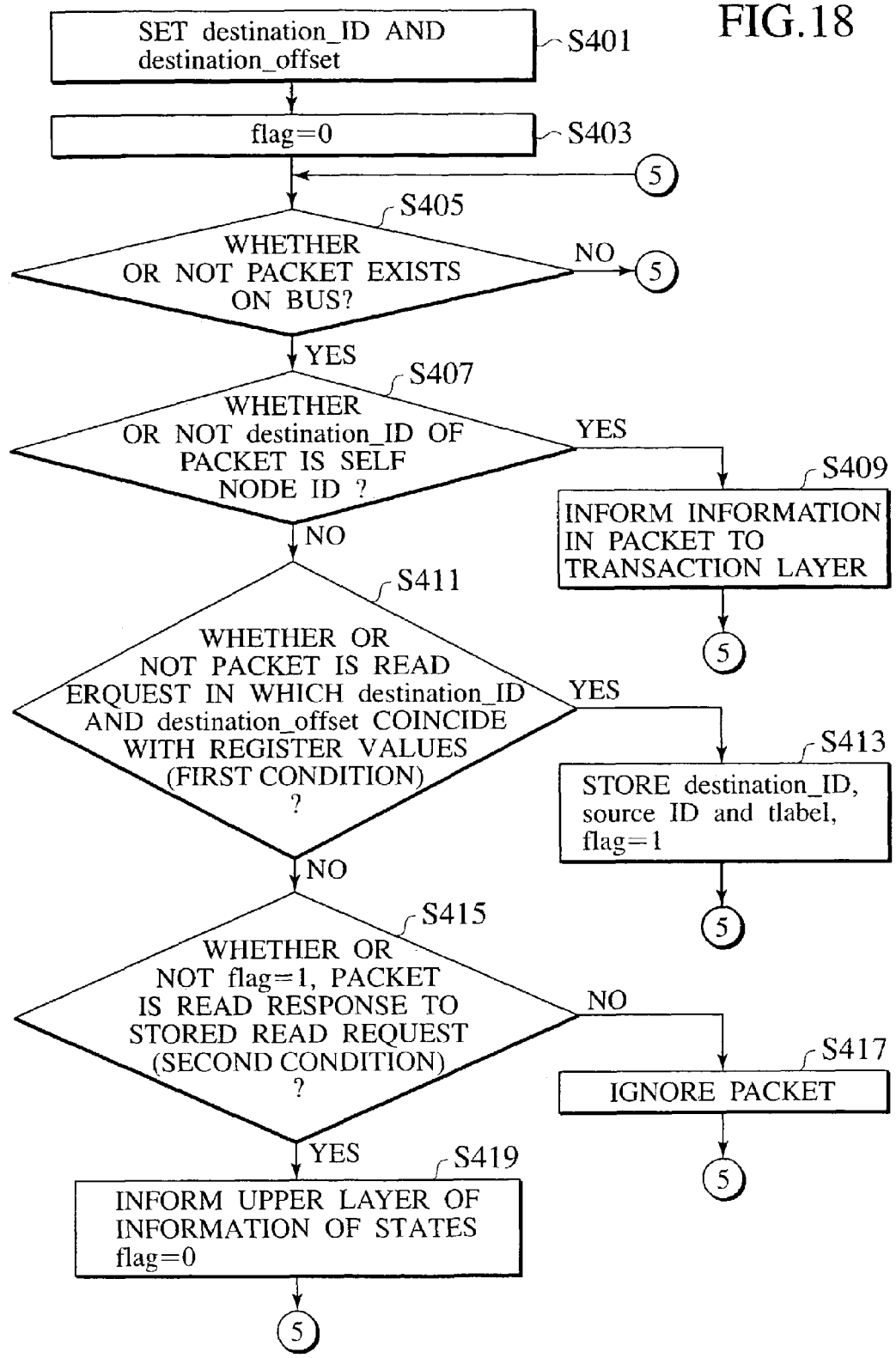
FIG. 18 is a flowchart illustrating a processing in the fourth embodiment of the present invention.

As shown in FIG. 18, in the fourth embodiment, a destination ID and a destination offset are first set in Step S401. Specifically, a node ID of a node, of which the state is desired to be known, is stored in a destination ID register of the storage unit 450, and an address of a state register of the node, of which the state is desired to be known, is stored in a destination offset register of the storage unit 450.

Next, the flag is set to 0 in Step S403. Then, it is checked whether or not a packet exists on the bus in Step S405, and if the packet exists on the bus, it is checked in Step S407 whether or not a destination ID of the packet coincides with the self node ID.

If the result of Step S407 is YES, information in the packet is transmitted to a transaction layer in Step S409.

If the result of Step S407 is NO, it is checked in Step S411 whether or not (1) a destination ID and a destination offset of the packet on the bus coincides with the destination ID and the destination offset, which are stored in the register in Step S401, respectively and (2) a transaction code of the packet on the bus is a read request code (a first condition).

If the result of Step S411 is YES, the destination ID, the source ID and the transaction label of the packet (first packet) on the bus are stored in Step S413, and the flag is set to 1. Then, the processing returns to Step S405, and Steps S407 and S411 are repeated.

If the result of Step S411 is NO, it is checked in Step S415 whether or not (1) the flag is set to 1 and (2) the packet on the bus is a read response packet for the read request packet stored in Step S413 (a second condition).

Specifically, it is checked whether or not 1 is written into the flag register of the storage unit 450, and the extraction unit 120 is allowed to extract a destination ID, a source ID, a transaction label, a transaction code and data from the packet (second packet) on the bus. The coincidence judgment unit 130 is allowed to compare (1) the destination ID extracted from the second packet on the bus with the source ID of the first packet, which is stored in Step S413, (2) the source ID extracted from the second packet on the bus with the destination ID of the first packet, which is stored in Step S413, (3) the transaction label extracted from the second packet on the bus with the transaction label of the first packet, which is stored in Step S413 and (4) the transaction code extracted from the second packet on the bus with the previously stored read response code.

If the result of Step S415 is NO, the packet on the bus is ignored in Step S417.

If the result of Step S415 is. YES, in Step S419, information regarding the states of the second packet on the bus are transmitted to the upper layer, and the flag is set back to 0.

As described above, according to the fourth embodiment, a reception condition of a read request packet is that (1) the destination ID indicates a specific node and the destination offset is the address of the state register, and a reception condition of a read response packet is that (2) the read response packet is a response to the read request packet. Thus, even in the case of read response packets addressed to other nodes, a read response packet containing quadlet data read from a state register of a specific node ID can be transmitted to the upper layer of another node.

Fifth Embodiment

In a fifth embodiment, it is possible to inform an upper layer of a node of a state of a specific node by obtaining necessary information from packets addressed to other nodes instead of from a packet addressed to a self node. In the foregoing first to fourth embodiments, the necessary information is obtained from the read response packets addressed to the other nodes. However, in the fifth embodiment, the necessary information is obtained from write request packets or lock request packets, which are addressed to the other nodes.

The fifth embodiment relates to a condition as described below. Specifically, for a certain node (for example, a node b), the number of nodes capable of establishing connection states in an upper application is judged, and the maximum number of nodes capable of establishing the connection states therewith have already logged into the node b. Thus, another node (for example, a node a), which has not yet logged in, is waiting for a vacancy.

Figure 19:
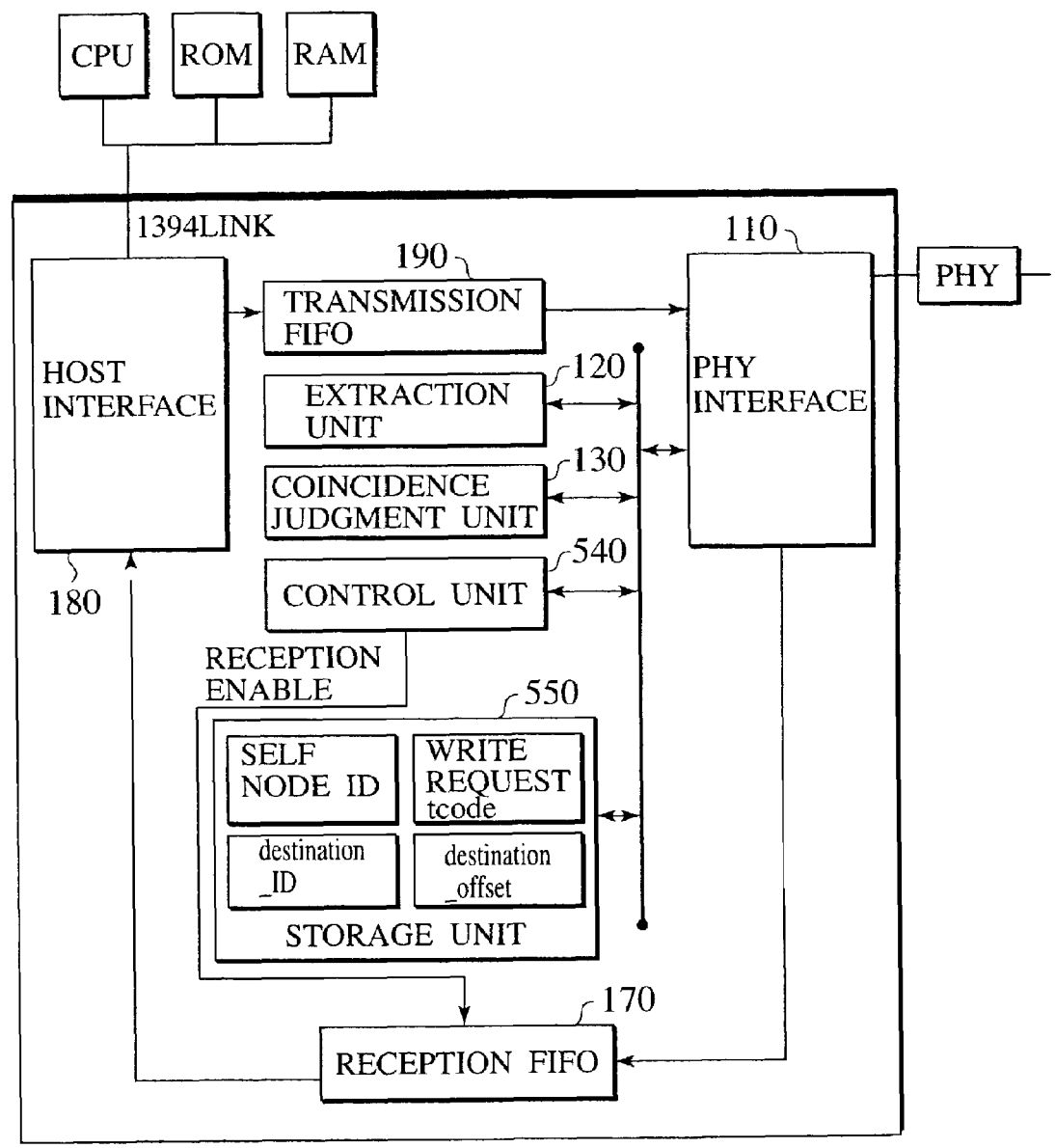
FIG. 19 is a block diagram showing a constitution of a packet transmitter-receiver according to a fifth embodiment of the present invention.

As shown in FIG. 19, a self node ID, a write request transaction code, a destination ID and a destination offset are stored in a storage unit 550. The self node ID and the write request transaction code are stored in the storage unit 550 before reception of packets. The maximum number of nodes are already connected to the node whose state is desired to be known.

Figure 20:
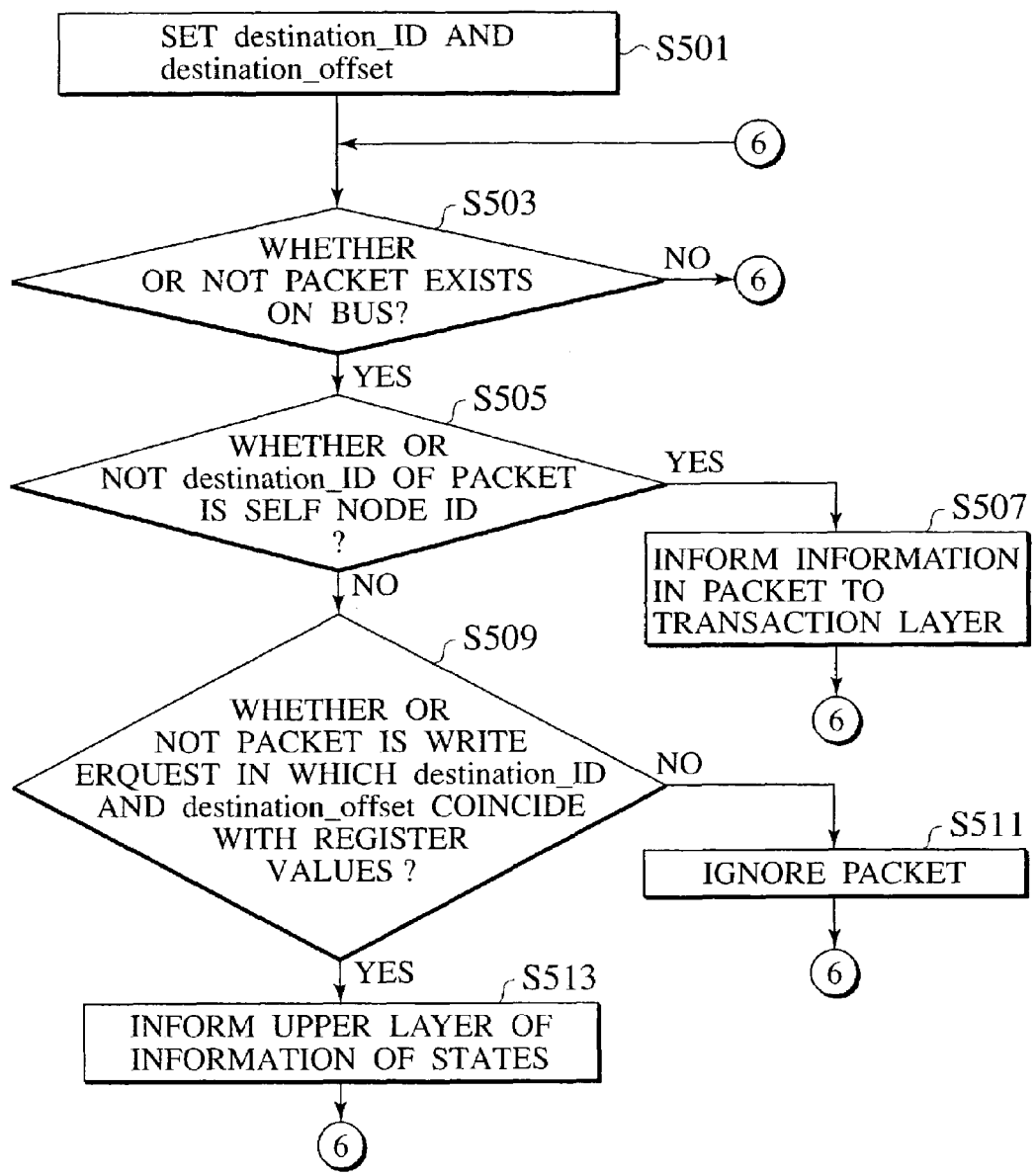
FIG. 20 is a flowchart illustrating a processing in the fifth embodiment of the present invention.

As shown in FIG. 20, in the fifth embodiment, a destination ID and a destination offset are first set in Step S501. Specifically, an ID of the node, of which the state is desired to be known, is stored in a destination ID register, and an address of a login/log-out register of the node, of which the state is desired to be known, is stored in a destination offset register.

Next, it is checked whether or not a packet exists on the bus in Step S503, and if the packet exists on the bus, it is checked in Step S505 whether or not a destination ID of the packet coincides with the self node ID.

If the result of Step S505 is YES, information in the packet is transmitted to a transaction layer in Step S507.

If the result of Step S505 is NO, it is checked in Step S509 whether or not a destination ID and a destination offset of the packet on the bus coincides with the destination ID and the destination offset, which are stored in the register in Step S501, respectively, and the packet on the bus is a write request packet.

If the result of Step S509 is NO, the packet on the bus is ignored in Step S511.

If the result of Step S509 is YES, in Step S513, information of the states is transmitted to the upper layer. Herein, the term "information of the states" means data written by the write request packet. When a unit of the written data is 1 quadlet (32 bit) and data of 1 quadlet or more is written, data written by one write request packet is a part of the entire data.

As described above, according to the fifth embodiment, a reception condition of the write request packet is that the destination ID indicates a specific node and the destination offset specifies a specific address. Thus, even in the case of write request packets addressed to other nodes, as to the write request packet for the specific address of the specific node, quadlet data in the packet can be transmitted to the upper layer of a node. Accordingly, since the number of the nodes capable of establishing the connection states with a specific node b in the upper application is judged or determined for the node b and the nodes of the number capable of establishing the connection states therewith are already logged into the node b, the node a can know a value of a specific address of the node b even in a state where the node a is waiting for any of the nodes logging into the node b to log out.

Modification of Fifth Embodiment

Figure 21:
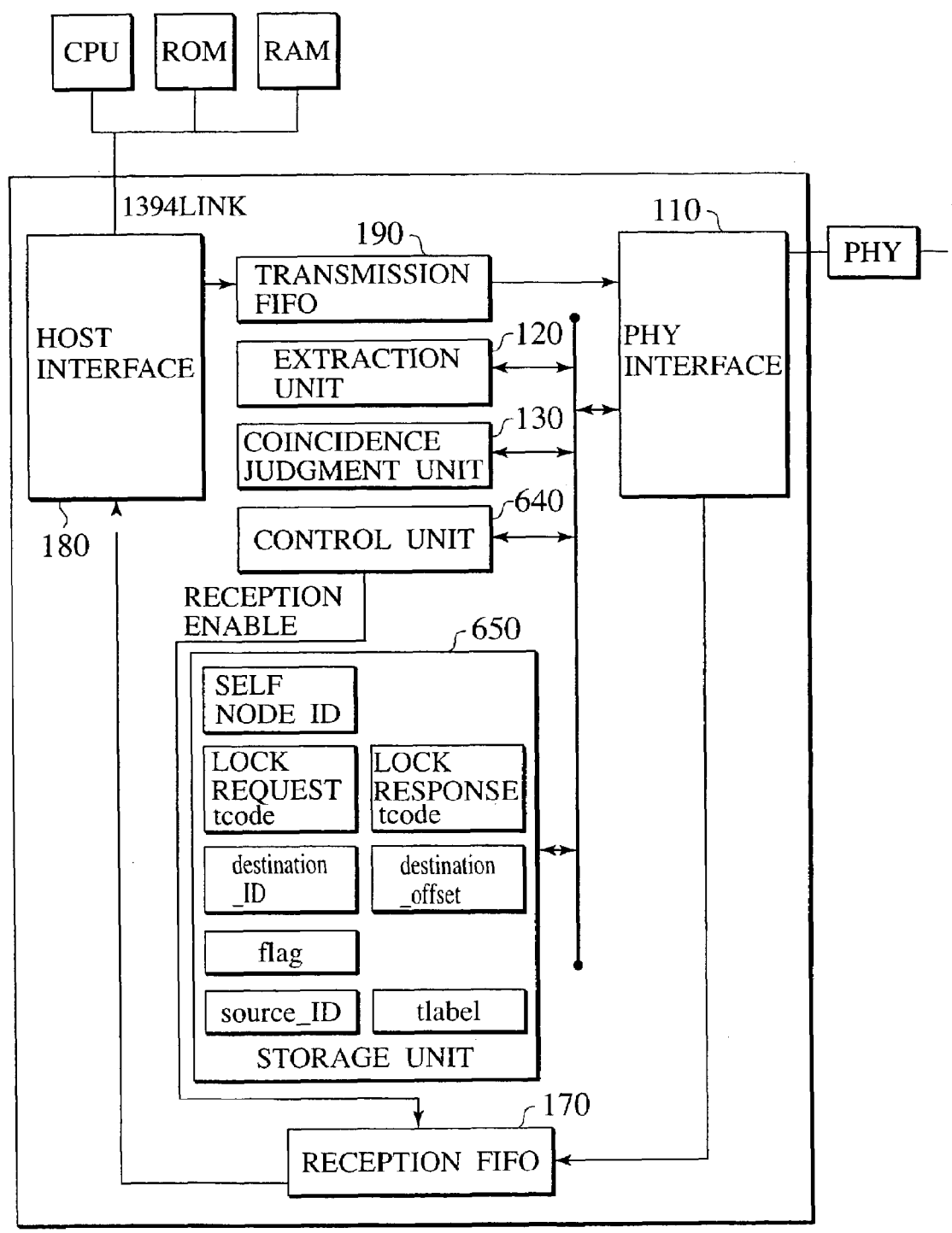
FIG. 21 is a block diagram showing a constitution of a packet transmitter-receiver according to a modified example of the fifth embodiment of the present invention.

As shown in FIG. 21, a self node ID, a lock request transaction code, a lock response transaction code, a destination ID, a destination offset, a flag, a source ID and a tlabel are stored in a storage unit 650.

Steps S521, S525, S527 and S529 shown in FIG. 22 are the same as Steps S501, S503, S505 and S507 shown in FIG. 20, respectively. Thus, description thereof will be omitted. Moreover, in Step S523 shown in FIG. 22, the flag is set to 0.

If the result of Step S527 is NO, in Step S531, it is checked whether or not a destination ID and a destination offset of a packet on the bus coincide with the destination ID and the destination offset, which are stored in the register in Step S521, respectively, and a transaction code of the packet on the bus, which is extracted, coincides with the lock request transaction code stored in the storage unit (a first condition).

If the result of Step S531 is YES, the destination ID, the source ID and the transaction label of the packet (first packet) on the bus are stored in Step S533, and the flag is set to 1. Then, the processing returns to Step S525, and Steps S527 and S531 are repeated.

If the result of Step S531 is NO, it is checked in Step S531 whether or not (1) the flag is set to 1 and (2) the packet (second packet) on the bus is a lock response packet for the lock request packet stored in Step S533 (a second condition).

Specifically, it is checked whether or not 1 is written into the flag register of the storage unit 650, and the extraction unit 120 is allowed to extract a destination ID, a source ID, a transaction label, and a transaction code and data from the packet (second packet) on the bus. Moreover, the coincidence judgment unit 130 is allowed to compare (1) the destination ID extracted from the second packet on the bus with the source ID of the first packet, which is stored in Step S533, (2) the source ID extracted from the second packet on the bus with the destination ID of the first packet, which is stored in Step S533, (3) the transaction label extracted from the second packet on the bus with the transaction label of the first packet, which is stored in Step S533 and (4) the transaction code extracted from the second packet on the bus with the previously stored lock response code.

If the result of Step S535 is NO, the packet on the bus is ignored in Step S537.

If the result of Step S535 is YES, in Step S539, information of the states of the second packet on the bus are transmitted to the upper layer of a node. The term "information of the states" has the same meaning as the term "information of the states" in the foregoing Step S513.

As described above, according to a modified example of the fifth embodiment, a reception condition of a lock request packet is that (1) the destination ID indicates a specific node and the destination offset specifies a specific address, and a reception condition of a lock response packet is that (2) the lock response packet is a response packet to the lock request packet. Thus, even in the case of lock response packets addressed to other nodes, as to a lock response packet related to the specific address of the specific node, quadlet data in the packet can be transmitted to the upper layer of the node. Accordingly, even when, for example, a node a is locked by a node b, a node c can obtain information of a state of the node a from a lock response packet addressed to the node b from the node a.

Various modifications will become possible for those skilled in the art after receiving the teaching of the present disclosure without departing from the scope thereof.

What is claimed is:

1. A method for receiving a first packet and a second packet, and transmitting to an upper layer of a node information included in the second packet, comprising:
    judging whether a first packet satisfies a first condition;
    storing information contained in the first packet and used as at least a part of a second condition when the first packet is judged to satisfy the first condition;
    judging whether a second packet satisfies the second condition when the first packet fails to satisfy the first condition; and
    enabling information in the second packet to be transmitted to the upper layer when the second packet is judged to satisfy the second condition, wherein
    the first condition includes a destination offset of the first packet coinciding with an address previously stored and a first transaction code of the first packet coinciding with a read request transaction code,
    information used as the second condition includes a first destination ID of the first packet, a first source ID and a first transaction label, and
    the second condition includes a second destination ID of the second packet coinciding with the first source ID, a second source ID of the second packet coinciding with the first destination ID, a second transaction label of the second packet coinciding with the first transaction label and a second transaction code of the second packet coinciding with a read response transaction code.

2. The method of claim 1, wherein the previously stored address is an address of an EUI-64.

3. The method of claim 2, wherein the second condition further includes that a value of the EUI-64 of the second packet coincides with the previously stored value of the EUI-64.

4. The method of claim 1, wherein
    a key type, a key value and an upper protocol are previously stored,
    the previously stored address is an address of a configuration ROM, and
    the second condition further includes values of data sent to a destination node from the second packet coinciding with the key type, the key value and the upper protocol, which are previously stored.

5. The method of claim 1, wherein
    a destination ID is further stored before receiving the first and second packets, and
    the first condition further includes a first destination ID of the first packet coinciding with the previously stored destination ID.

6. A method for receiving a first packet and a second packet, and transmitting to an upper layer of a node information included in the second packet, comprising:
    judging whether a first packet satisfies a first condition;
    storing information contained in the first packet and used as at least a part of a second condition when the first packet is judged to satisfy the first condition;
    judging whether a second packet satisfies the second condition when the first packet fails to satisfy the first condition; and
    enabling information in the second packet to be transmitted to the upper layer when the second packet is judged to satisfy the second condition, wherein
    a destination ID and a destination offset are stored before receiving the first and second packets,
    the first condition includes a first destination ID of the first packet coinciding with the previously stored destination ID, a first destination offset of the first packet coinciding with the previously stored destination offset and a first transaction code of the first packet coinciding with a lock request transaction code,
    information used as the second condition includes the first destination ID, a first source ID of the first packet and a first transaction label, and
    the second condition includes a second destination ID of the second packet coinciding with the first source ID, a second source ID of the second packet coinciding with the first destination ID, a second transaction label of the second packet coinciding with the first transaction label, and a transaction code of the second packet coinciding with the lock response transaction label.

7. An apparatus for transmitting information included in a packet to an upper layer of a node, comprising:
    an extraction unit configured to extract from first and second packets at least a part of the information included in the packets;
    a storage unit configured to store the information necessary to judge whether a first condition is satisfied and the information necessary to judge whether a second condition is satisfied;
    a judgment unit configured to judge whether the first packet satisfies the first condition and whether the second packet satisfies the second condition; and a control unit configured to allow the extraction unit to extract from the first packet the information necessary to judge whether the first condition is satisfied, to allow the judgment unit to judge whether the first packet satisfies the first condition, to permit the storage unit to store the information, included in the first packet and used as at least a part of the second condition, when the first packet satisfies the first condition, to permit the extraction unit to extract from the second packet the information necessary to judge whether the second condition is satisfied when the first packet fails to satisfy the first condition, to permit the judgment unit to judge whether the second packet satisfies the second condition and to enable at least a part of the information included in the second packet to be transmitted to the upper layer of a node when the second packet satisfies the second condition, wherein the storage unit is configured to have previously stored therein an EUI-64 address, a read request transaction code and a read response transaction code and to store a first source ID, a first destination ID and a first transaction label, which are extracted from the first packet as the information necessary for judging whether the first condition is satisfied, and the control unit is configured to permit the judgment unit to judge, as the first condition, whether a destination offset of the first packet coincides with the EUI-64 address and a first transaction code of the first packet coincides with the read request transaction code, and to judge, as the second condition, whether a second source ID of the second packet coincides with the first destination ID, a second destination ID of the second packet coincides with the first source ID, a second transaction code of the second packet coincides with the read response transaction code, and a second transaction label of the second packet coincides with the first transaction label.

8. The apparatus of claim 7, wherein the storage unit is configured to have previously stored a first EUI-64 value, and the control unit is configured to permit the judgment unit to further judge, as the second condition, whether a second EUI-64 value of the second packet coincides with the first EUI-64 value.

9. An apparatus for transmitting information included in a packet to an upper layer of a node, comprising:

an extraction unit configured to extract from first and second packets at least a part of the information included in the packets;

a storage unit configured to store the information necessary to judge whether a first condition is satisfied and the information necessary to judge whether a second condition is satisfied;

a judgment unit configured to judge whether the first packet satisfies the first condition and whether the second packet satisfies the second condition; and a control unit configured to allow the extraction unit to extract from the first packet the information necessary to judge whether the first condition is satisfied, to allow the judgment unit to judge whether the first packet satisfies the first condition, to permit the storage unit to store the information, included in the first packet and used as at least a part of the second condition, when the first packet satisfies the first condition, to permit the extraction unit to extract from the second packet the information necessary to judge whether the second condition is satisfied when the first packet fails to satisfy the first condition, to permit the judgment unit to judge whether the second racket satisfies the second condition and to enable at least a part of the information included in the second packet to be transmitted to the upper layer of a node when the second packet satisfies the second condition, wherein the storage unit is configured to have previously stored a configuration ROM address, a read request transaction code, a read response transaction code and a first upper protocol identifier, and to store a first source ID, a first destination ID and a first transaction label, which are extracted from the first packet as the information necessary for judging whether the first condition is satisfied, and the control unit is configured to permit the judgment unit to judge, as the first condition, whether a destination offset of the first packet coincides with the configuration ROM address, a transaction code of the first packet coincides with the read request transaction code, and to judge, as the second condition, whether a second source ID of the second packet coincides with the first destination ID, a second destination ID of the second packet coincides with the first source ID, a second transaction code of the second packet coincides with the read response transaction code, a second transaction label of the second packet coincides with the first transaction label, and a second upper protocol identifier of the second packet coincides with the first upper protocol identifier.

10. An apparatus for transmitting information included in a packet to an upper layer of a node, comprising:

an extraction unit configured to extract from first and second packets at least a part of the information included in the packets;

a storage unit configured to store the information necessary to judge whether a first condition is satisfied and the information necessary to judge whether a second condition is satisfied;

a judgment unit configured to judge whether the first packet satisfies the first condition and whether the second packet satisfies the second condition; and a control unit configured to allow the extraction unit to extract from the first packet the information necessary to judge whether the first condition is satisfied, to allow the judgment unit to judge whether the first packet satisfies the first condition, to permit the storage unit to store the information, included in the first packet and used as at least a part of the second condition, when the first packet satisfies the first condition, to permit the extraction unit to extract from the second packet the information necessary to judge whether the second condition is satisfied when the first packet fails to satisfy the first condition, to permit the judgment unit to judge whether the second packet satisfies the second condition and to enable at least a part of the information included in the second packet to be transmitted to the upper layer of a node when the second packet satisfies the second condition, wherein the storage unit is configured to have previously stored a setting destination offset, a read request transaction code and a read response transaction code, and to store a first source ID, a first destination ID and a first transaction label, which are extracted from the first packet as the information necessary for judging whether the first condition is satisfied, and the control unit is configured to permit the judgment unit to judge, as the first condition, whether a first destination offset of the first packet coincides with the setting destination offset, and a transaction code of the first packet coincides with the read request transaction code, and to judge, as the second condition, whether a second source ID of the second packet coincides with the first destination ID, a second destination ID of the second packet coincides with the first source ID, a second transaction code of the second packet coincides with the read response transaction code, and a second transaction label of the second packet coincides with the first transaction label.

11. An apparatus for transmitting information included in a packet to an upper layer of a node, comprising:

an extraction unit configured to extract at least a part of the information included in the packet from a received packet;

a storage unit configured to store information necessary to judge whether the packet satisfies an upper layer informing condition;

a judgment unit configured to judge whether the packet satisfies the upper layer informing condition; and a control unit configured to permit the extraction unit to extract from the packet the information necessary to judge whether the upper layer informing condition is satisfied, to permit the judgment unit to judge whether the packet satisfies the upper layer informing condition and to enable at least a part of the information included in the packet to be transmitted to the upper layer of a node when the packet satisfies the upper layer informing condition, wherein the storage unit is configured to have previously stored a write request transaction code, a setting destination ID and a setting destination offset, and the control unit is configured to permit the destination unit to judge, as the upper layer informing condition, whether a destination ID of the packet coincides with the setting destination ID, a destination offset of the packet coincides with the setting destination offset, and a transaction code of the packet coincides with the write request transaction code.

12. An apparatus for transmitting information included in a packet to an upper layer of a node, comprising:

an extraction unit configured to extract from first and second packets at least a part of the information included in the packets;

a storage unit configured to store the information necessary to judge whether a first condition is satisfied and the information necessary to judge whether a second condition is satisfied;

a judgment unit configured to judge whether the first packet satisfies the first condition and whether the second packet satisfies the second condition; and a control unit configured to allow the extraction unit to extract from the first packet the information necessary to judge whether the first condition is satisfied, to allow the judgment unit to judge whether the first packet satisfies the first condition, to permit the storage unit to store the information, included in the first packet and used as at least a part of the second condition, when the first packet satisfies the first condition, to permit the extraction unit to extract from the second packet the information necessary to judge whether the second condition is satisfied when the first packet fails to satisfy the first condition, to permit the judgment unit to judge whether the second packet satisfies the second condition and to enable at least a part of the information included in the second packet to be transmitted to the upper layer of a node when the second packet satisfies the second condition, wherein the storage unit is configured to have previously stored a setting destination ID, a setting destination offset, a lock request transaction code and a lock response transaction code, and to store a first destination ID, a first source ID and a first transaction label, which are extracted from the first packet as the information necessary for judging whether the first condition is satisfied, and the control unit is configured to permit the judgment unit to judge, as the first condition, whether the first destination ID coincides with the setting destination ID, a first destination offset of the first packet coincides with the setting destination offset, and a transaction code of the first packet coincides with the lock request transaction code, and to judge, as the second condition, whether a second source ID of the second packet coincides with the first destination ID, a second destination ID of the second packet coincides with the first source ID, a second transaction code of the second packet coincides with the lock response transaction code, and a second transaction label of the second packet coincides with the first transaction label.

* * * * *